United States Patent
Jang et al.

(10) Patent No.: US 8,687,388 B2
(45) Date of Patent: Apr. 1, 2014

(54) THREE-PHASE SOFT-SWITCHED PFC RECTIFIERS

(75) Inventors: Yungtaek Jang, Chapel Hill, NC (US); Milan Jovanovic, Cary, NC (US)

(73) Assignee: Delta Electronics, Inc., Taipei (TW)

( * ) Notice: Subject to any disclaimer, the term of this patent is extended or adjusted under 35 U.S.C. 154(b) by 121 days.

(21) Appl. No.: 13/362,620

(22) Filed: Jan. 31, 2012

(65) Prior Publication Data

US 2013/0194838 A1 Aug. 1, 2013

(51) Int. Cl.
*H02M 1/12* (2006.01)

(52) U.S. Cl.
USPC .......................................................... 363/44

(58) Field of Classification Search
USPC ............ 363/39, 40, 44, 84, 89, 125; 307/105, 307/110
See application file for complete search history.

(56) References Cited

U.S. PATENT DOCUMENTS

| | | | |
|---|---|---|---|
| 5,499,178 A | | 3/1996 | Mohan |
| 5,654,882 A | * | 8/1997 | Kanazawa et al. ............. 363/37 |
| 5,719,757 A | * | 2/1998 | Beyerlein et al. ............. 363/34 |
| 5,933,336 A | * | 8/1999 | Jiang et al. ..................... 363/44 |
| 5,982,646 A | * | 11/1999 | Lyons et al. .................... 363/58 |
| 6,026,006 A | | 2/2000 | Jiang et al. |
| 6,038,151 A | * | 3/2000 | Jiang et al. ..................... 363/89 |
| 6,239,995 B1 | | 5/2001 | Weng et al. |
| 6,567,283 B2 | * | 5/2003 | Welches ......................... 363/89 |
| 6,671,195 B2 | * | 12/2003 | Perreault et al. ............... 363/89 |
| 6,900,997 B2 | * | 5/2005 | Perreault et al. .............. 363/127 |
| 7,005,759 B2 | | 2/2006 | Ying et al. |
| 7,920,393 B2 | * | 4/2011 | Bendre et al. .................. 363/39 |
| 7,932,693 B2 | * | 4/2011 | Lee et al. ...................... 318/802 |

OTHER PUBLICATIONS

Barbosa, Peter et al.: "Analysis and Evaluation of the Two-Switch Three-Level Boost Rectifier", *IEEE Power Electronics Specialist Conf. (PESC) Record*, 2001, pp. 1659-1664.
Contreras, Jose G. et al.: "A Three-Phase High Power Factor PWM ZVS Power Supply with a Single Power Stage", pp. 356-362.
Kolar, J. W. et al.: "A Novel Three-Phase Utility Interface Minimizing Line Current Harmonics of High-Power Telecommunication Rectifiers Modules", Record of the 16th, *IEEE International Telecommunications Energy Conference*, Vancouver, Canada, Oct. 30-Nov. 3, pp. 367-374, 1994.

(Continued)

*Primary Examiner* — Adolf Berhane
(74) *Attorney, Agent, or Firm* — Venable LLP; Robert S. Babayi

(57) ABSTRACT

A low input-current harmonic three-phase boost rectifier includes an input stage for receiving a three-phase input voltage in relation to a neutral node and an output stage adapted to couple to at least one load. The rectifier further includes one or more switching converter stages, each having a plurality of switches coupled to the neutral node, the plurality of switches operating with a fixed duty cycle, the fixed duty cycle being a substantially 50% duty cycle. The rectifier further includes one or more controllers adapted to vary the switching frequency of the plurality of switches based on at least one of a condition of the at least one load or the input voltage and includes one or more decoupling stages, each including one or more inductive elements adapted to inductively decouple the output stage from at least one of the one or more switching converter stages.

53 Claims, 50 Drawing Sheets

(56) References Cited

OTHER PUBLICATIONS

Meng, Tao, et al.: "Improved Three-Phase Single-Stage Isolated PFC Converter with Voltage-Clamping in Primary Side", *Department of Electrical Engineering, Harbin Institute of Technology*, pp. 1909-1913.

Nishimura, K. et al.: "A Novel Prototype Discontinuous Inductor Current Mode Operated Three-Phase PFC Power Converter with Four Active Switches", *IEEE Power Electronics Specialist Conf. (PESC) Record*, 2006, pp. 824-830.

Prasad, A. R. et al.: "An Active Power Factor Correction Technique for Three-Phase Diode Rectifiers", *IEEE Transactions on Power Electronics*, vol. 6, No. 1, pp. 83-92, Jan. 1991.

Xu, D. M. et al.: "Quasa Soft-Switching Partly Decoupled Three-Phase PFC with Approximate Unity Power Factor", *IEEE Applied Power Electronics Conference (APEC) Proc.*, 1998, pp. 953-957.

\* cited by examiner

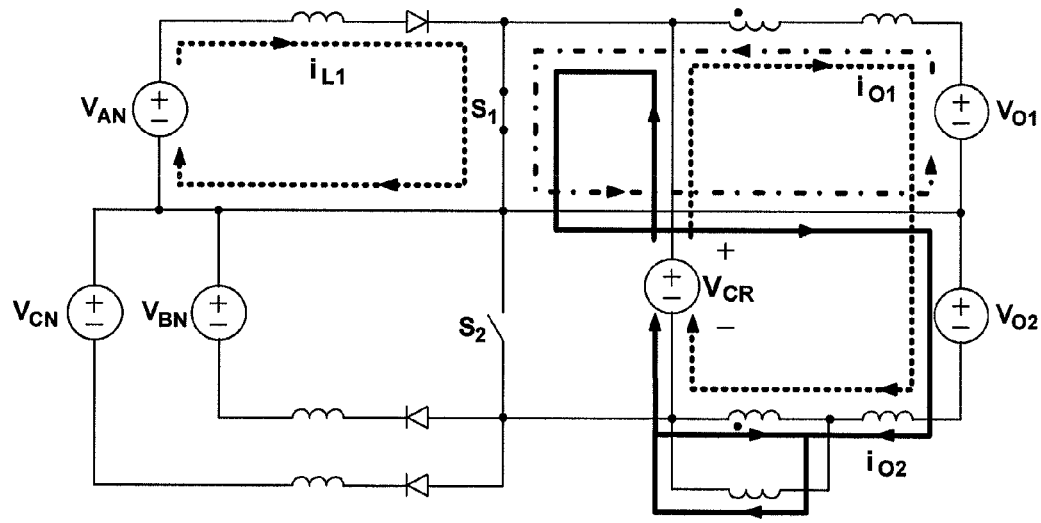
Fig. 8a [$T_0$-$T_1$]
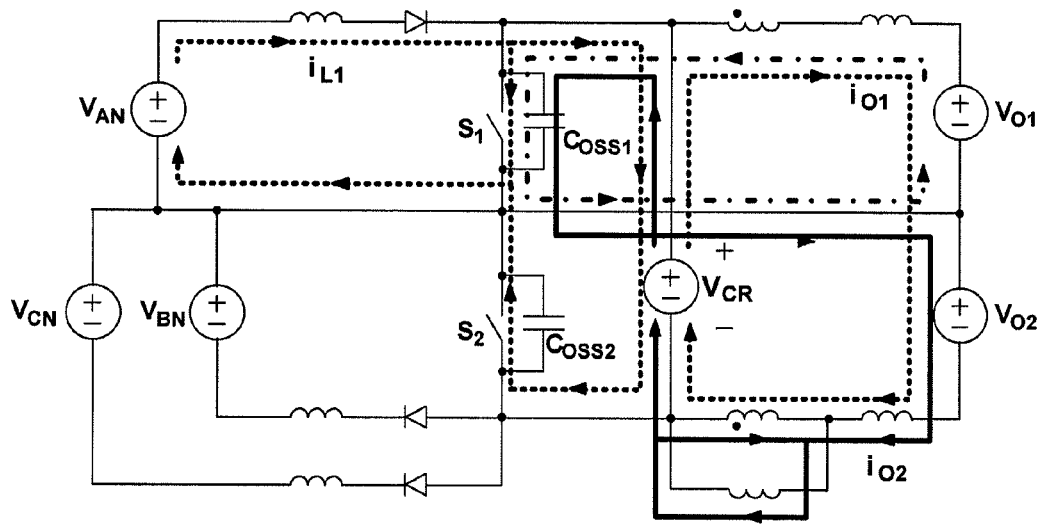
Fig. 8b [$T_1$-$T_2$]

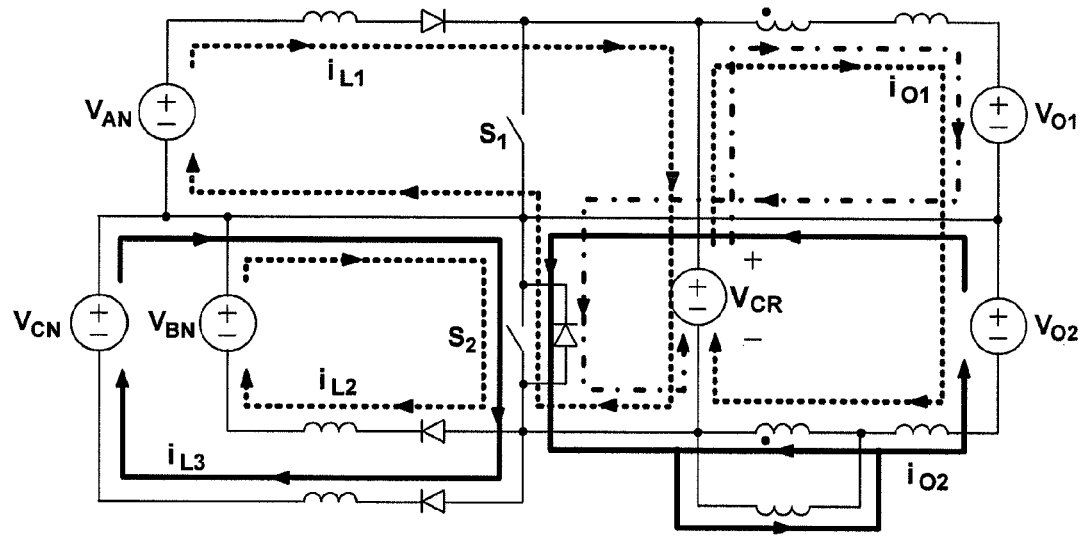
Fig. 8c [$T_2$-$T_3$]
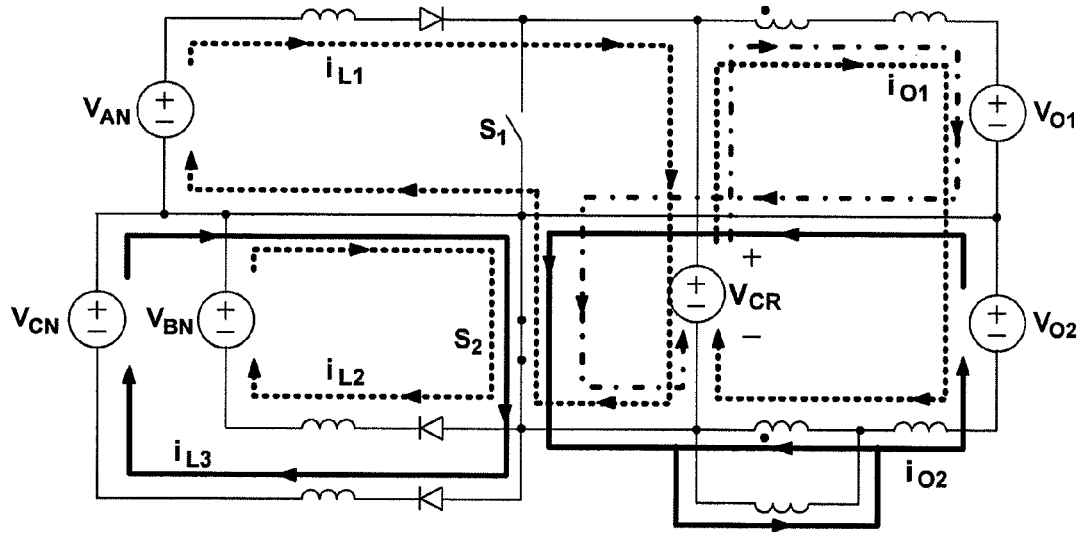
Fig. 8d [$T_3$-$T_4$]

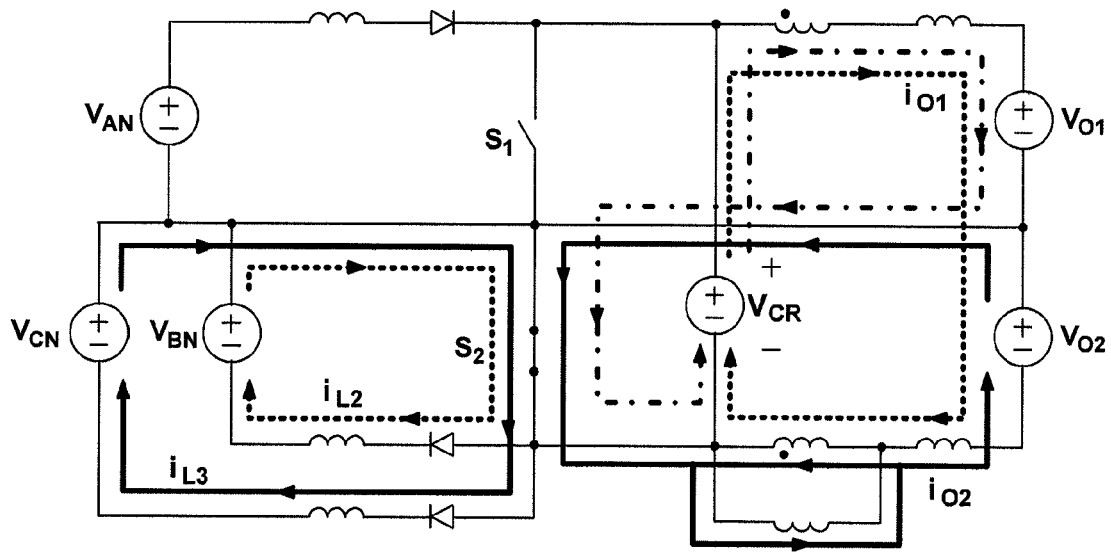
Fig. 8e [$T_4$-$T_5$]
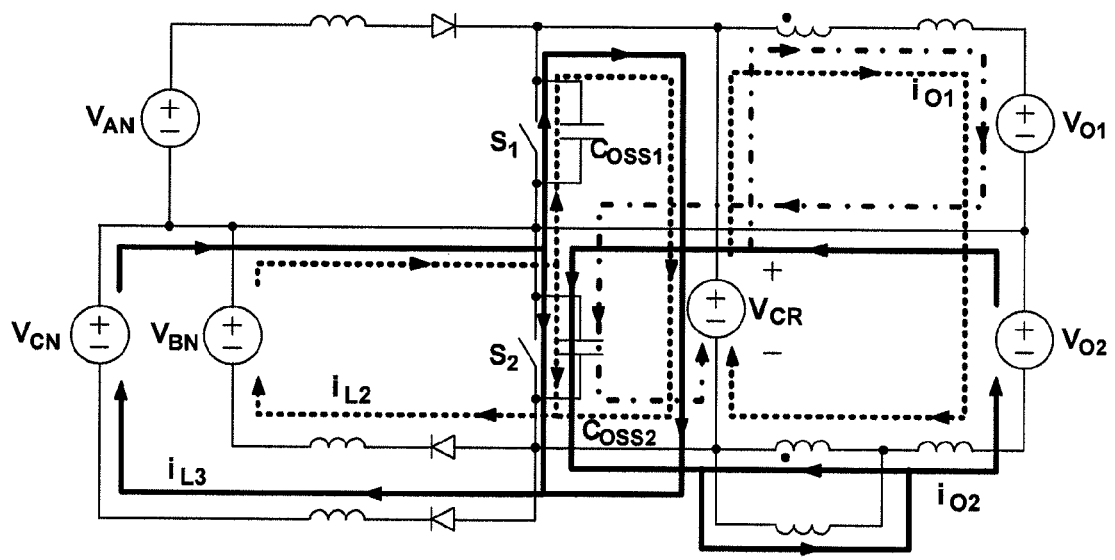
Fig. 8f [$T_5$-$T_6$]

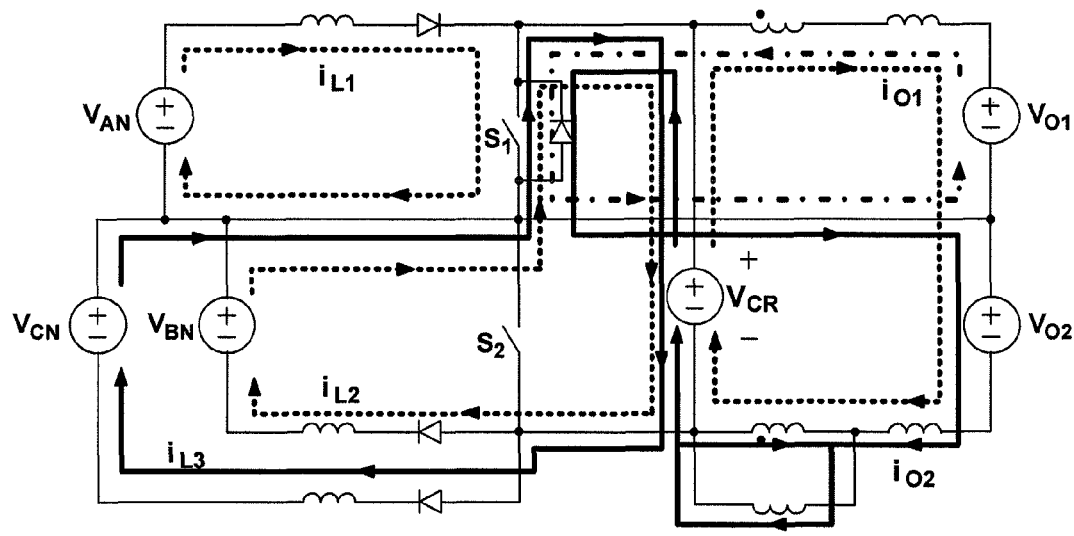
Fig. 8g [T₆-T₇]
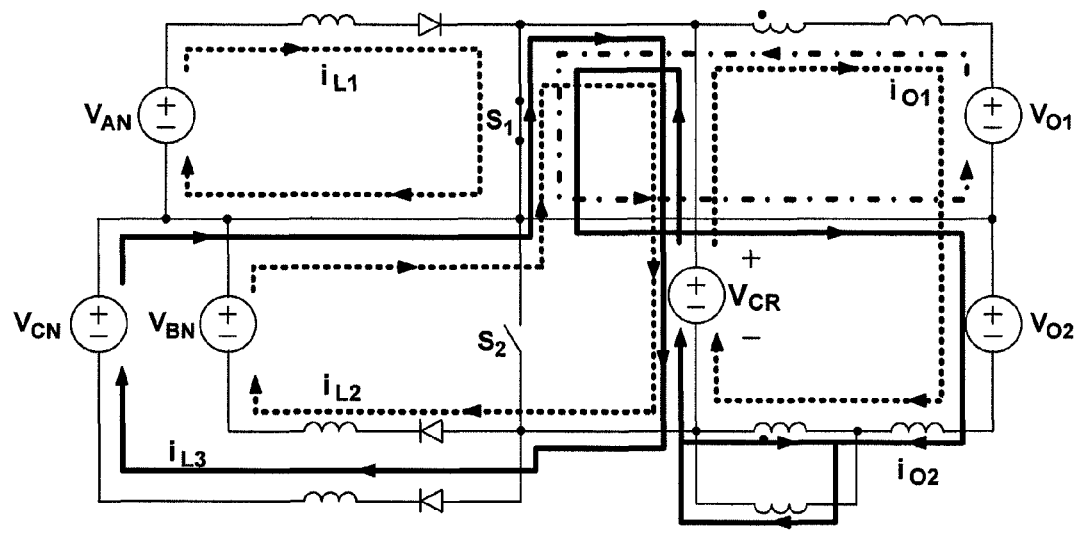
Fig. 8h [T₇-T₈]

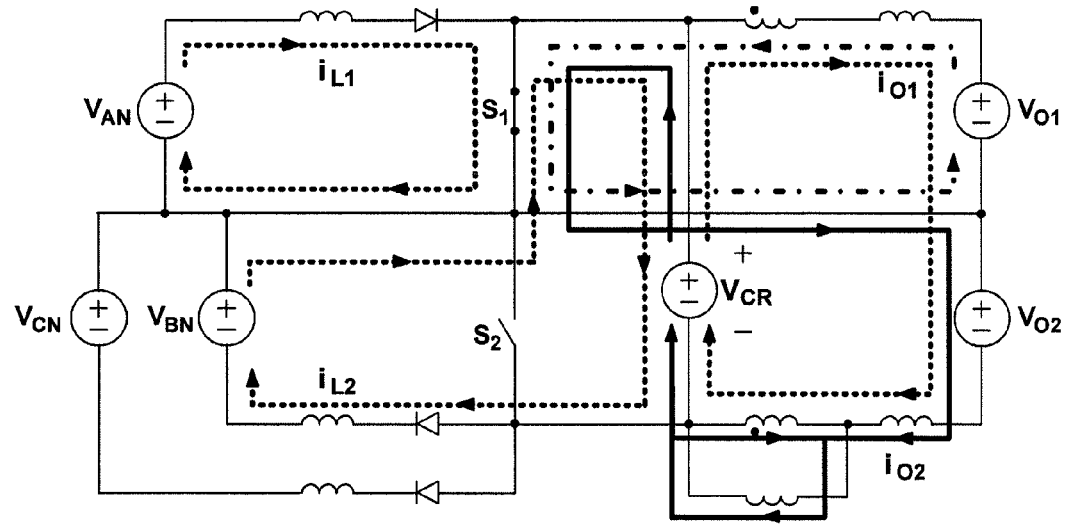
Fig. 8i [ $T_8$ - $T_9$ ]
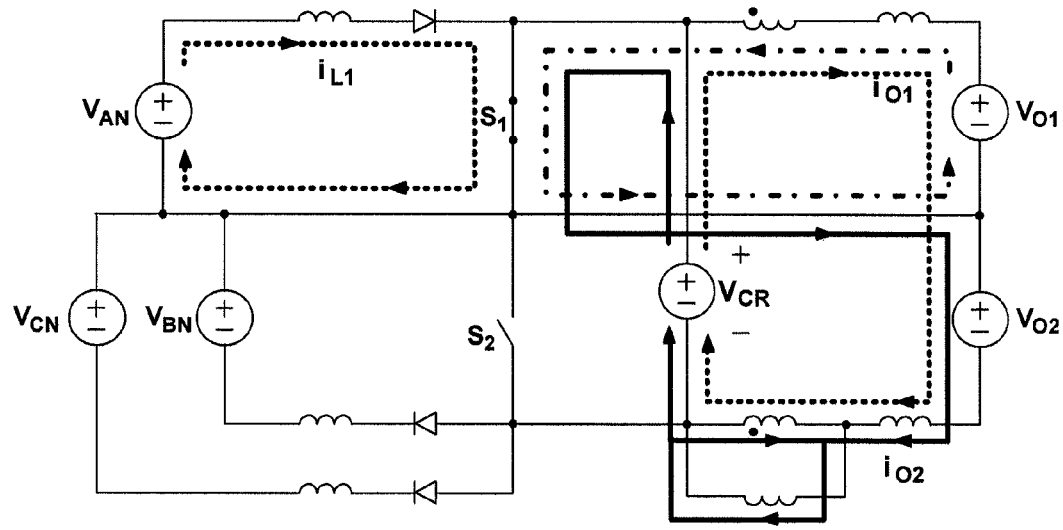
Fig. 8j [ $T_9$ - $T_{10}$ ]

THREE-PHASE SOFT-SWITCHED PFC RECTIFIERS

FIELD OF THE INVENTION

The present invention generally relates to front-end rectifiers with power-factor correction (PFC) and more particularly to three-phase PFC rectifiers.

BACKGROUND

It is well established that three-phase power-factor-correction (PFC) rectifiers with three or more switches exhibit superior power factor (PF) and total harmonic distortion (THD) compared with those implemented with a fewer number of switches that cannot actively shape each phase current independently. However, because of the simplicity and low cost, single and two switch rectifiers are still very attractive for employment in cost-sensitive applications.

FIG. 1 shows the most commonly employed prior art three-phase single-switch rectifier. This simple three-phase boost rectifier performs low-harmonic rectification by operating in the discontinuous-conduction mode (DCM), i.e., by allowing the boost inductors to completely discharge their energies in each switching cycle. As well known, in the DCM of operation, line currents of the boost rectifier tend to naturally follow the respective line voltages, which results in improved THD and PF of the line currents. Since the inductor currents are not directly regulated, the switch is exclusively used to regulate the output voltage with a low-bandwidth constant-frequency control. As reported in the literature, the circuit in FIG. 1 can achieve the THD in the 10-20% and the PF in the 0.94-0.96 range, respectively, which may be sufficient in some applications.

Generally, the major obstacle to achieving a better THD is relatively long discharging times of the boost inductors compared to their charging times. Namely, the charging currents of the inductors (during the intervals the switch is on) are proportional to their respective phase voltages and, therefore, do not contribute to current distortion. However, the discharging current of each inductor (during the intervals the switch is off) is proportional to differences between the output voltage and all three-phase voltages, which introduces a distortion in the average phase currents. To minimize the current distortion, the discharging time of the inductors is made as short as possible by increasing the reset voltage of the inductors.

For a given input voltage, the reset voltage of the inductors can only be increased by increasing the output voltage. Since the output voltage in the circuit in FIG. 1 is already high (around 750 V for 380-V three-phase line-to-line input) because the boost operation requires that the output voltage is greater than twice the peak phase voltage, improvement of THD by increasing output voltage is not practical. Namely, an output voltage increase would require components with higher voltage ratings that are generally more expensive, as well as less efficient due to their increased conduction and switching losses.

The THD of the circuit can also be improved by various harmonic injection techniques. Since these techniques improve THD based on the control circuit refinements rather than power stage redesign, they do not suffer from cost and efficiency penalty. However, the improvements obtained by the reported harmonic-injection techniques are relatively modest.

Further THD and PF performance improvements can be obtained by resorting to two-switch three-phase rectifier implementations. FIG. 2 shows one prior art embodiment of this class of three-phase rectifiers. A detailed operation of the circuit is described in the paper "*Quasi-Soft-Switching Partly Decoupled Three-Phase PFC with Approximate Unity Power Factor*," by D. Xu et al., published at the IEEE Applied Power Electronics Conference (APEC) in 1998.

Generally, voltage stresses across the switch components are lowered in this circuit by connecting the neutral conductor to the mid-point of the switches and split output capacitors. This connection partially decouples the phase currents, i.e., makes the phase currents for the most part of the line period dependent only on their corresponding phase voltage, i.e., makes the three-phase PFC rectifier operate as three independent single-phase PFC rectifiers for most of a line period. As well known, in the single-phase PFC boost rectifier, line-current distortion can be reduced if the converter is always operated at the DCM with a slow band-width output control. Therefore, by operating the circuit in FIG. 2 at the DCM, its PFC can be achieved.

FIG. 3 shows another prior art circuit modifying the circuit in FIG. 2 by creating a virtual neutral for applications where the neutral is not available, i.e., in applications with three-wire power lines. The virtual neutral is obtained by the Y ("star") connection of capacitors $C_1$, $C_2$, and $C_3$ to the three line voltages. Since in this connection the potential of the common node of the three capacitors is the same as the potential of the neutral point of the power source, the average capacitor voltages are equal to the phase voltages. The circuit in FIG. 3 is described more in details in U.S. Pat. No. 7,005,759, "Integrated Converter Having Three-Phase Power Factor Correction," by Ying et all.

FIG. 4 illustrates prior art with further THD improvements obtained by removing connection between the mid-point of the switches and the split capacitors. With this connection removed, the reset voltage of the inductor is doubled, i.e., it is increased from one-half of the output voltage ($V_O/2$) to the full output voltage ($V_O$), which shortens the reset time of the inductor currents. The reduced reset (discharge) time of the current makes time intervals where the phases are decoupled shorter with respect to the time that they are not decoupled, which further improves THD.

FIG. 5 shows a prior art circuit with the circuit in FIG. 4 implemented without rectifier diodes $D_{O1}$ and $D_{O2}$. A thorough analysis of the circuit in FIG. 5 is given in the paper "*A Novel Prototype Discontinuous Inductor Current Mode Operated Three-Phase PFC Power Converter with Four Active Switches*," by K. Nishimura et all., published at the IEEE Power Electronics Specialists' Conference (PESC) in 2006. While the elimination of the rectifiers helps improve efficiency, it makes the interleaving of the circuit in FIG. 5 impossible, which may be a drawback since interleaving is often used to extend the power range of converters operating in DCM or at the CCM/DCM boundary.

One of the major issues of the two-switch three-phase rectifiers shown in FIGS. 2-5 is their EMI performance and, in particular, their common-mode noise. Namely, in all the above implementations, the upper and lower rail of the six-diode bridge rectifier experience fast high-voltage changes every time the corresponding switches are commutated. Furthermore, in the implementations shown in FIGS. 4 and 5 without split capacitors, the load is also subject to these voltage changes, exacerbating the common-mode noise problem. As a result, these circuits typically require multi-stage EMI filters, which increases their cost and size.

Another major issue with the above implementations is that they do not simultaneously provide PFC and voltage balancing of the split capacitors when load is connected across the capacitors. The splitting of the output capacitor and connecting loads across the split capacitors is very often used in today's three-phase rectifiers to enable the employment of downstream converters designed with lower-rated components that are more cost-effective and efficient than their high-voltage-rated counterparts. To use the split capacitor approach, these circuit needs to be supplemented with a voltage balancing circuit, which further increases the cost and may also affect its size.

Therefore, the need exists for a low input-current harmonic three-phase boost rectifier with improved EMI performance. The need further exists for a low input-current harmonic three-phase boost rectifier that simultaneously provides PFC and voltage balancing of split capacitors.

SUMMARY OF THE INVENTION

Briefly, according to one embodiment of the present invention, a low input-current harmonic three-phase boost rectifier includes an input stage for receiving a three-phase input voltage in relation to a neutral node and an output stage adapted to couple to at least one load. The output stage including a plurality of output capacitors coupled to the neutral node. The rectifier further includes one or more capacitors coupled between corresponding phases of the three-phase input voltage and the neutral node and includes one or more switching converter stages, each having a plurality of switches coupled to the neutral node, the plurality of switches operating with a fixed duty cycle, the fixed duty cycle being a substantially 50% duty cycle. The one or more converter stages further include one or more boost inductors that are coupled to corresponding phases of the three-phase input voltage, one or more input bridge diodes coupled between the one or more boost inductors and the plurality of switches of the converter stages, and one or more flying capacitors coupled across the plurality of switches of the converter stages.

The rectifier further includes one or more controllers adapted to vary the switching frequency of the plurality of switches based on at least one of a condition of the at least one load or the input voltage and includes one or more decoupling stages, each including one or more inductive elements adapted to inductively decouple the output stage from at least one of the one or more switching converter stages.

According to some of the more detailed features of the invention, one or more switches of the plurality of switches are turned on at a substantially zero voltage across the one or more switches. In another embodiment, the controller is adapted to vary the switching frequency based on at least one of a minimum frequency determined by a full load and a minimum input voltage or a maximum frequency determined by a light load and a maximum input voltage. In yet another embodiment, the controller is adapted to operate in a burst mode over the range between a light load and no load.

According to other more detailed features of the invention, the inductive elements are magnetically coupled. The inductive elements may include one or more induction-heating coils. The induction-heating coils may be coupled with corresponding coil selection switches. In another embodiment, each one of the output capacitors is adapted to couple across at least one load. In yet another embodiment, the voltages across each one of the output capacitors are substantially equal. In still another embodiment, the output capacitors of the output stages are coupled to an input neutral wire of a three-phase four-wire input system.

According to further more detailed features of the invention, the rectifier further includes a blocking capacitor coupled between the neutral node and the output capacitors of the output stage. In yet another embodiment, one or more blocking diodes are coupled between the plurality of switches and the one or more flying capacitors. In other aspects, one or more inrush current control circuits may be coupled between the input voltage and the capacitors. The input stage may further include input electromagnetic interference (EMI) filters. The input bridge diodes may be synchronous rectifiers. Each switch may include a metal-oxide-semiconductor field-effect transistor (MOSFET) or an insulated gate bipolar transistor (IGBT) with an antiparallel diode.

According to additional detailed features of the invention, the one or more switching converter stages include a plurality of switching converter stages, each being coupled to a corresponding one of the one or more decoupling stages. The controller is further adapted to operate the plurality of switches of the plurality of switching converter stages in an interleaved or a parallel manner. The one or more switching converter stages may be coupled to corresponding ones of the one or more decoupling stages through one or more blocking capacitors.

Briefly, according to another embodiment of the present invention, a low input-current harmonic three-phase boost rectifier includes an input stage for receiving a three-phase input voltage in relation to a neutral node and an output stage adapted to couple to at least one load. The output stage including a plurality of output capacitors coupled to the neutral node. The rectifier further includes one or more capacitors coupled between corresponding phases of the three-phase input voltage and the neutral node and includes at least two switching converter stages, each having a plurality of switches coupled to the neutral node, the plurality of switches operating with a fixed duty cycle, the fixed duty cycle being a substantially 50% duty cycle. The switching converter stages further include one or more boost inductors that are coupled to corresponding phases of the three-phase input voltage, one or more input bridge diodes coupled between the one or more boost inductors and the plurality of switches of the converter stages, and one or more flying capacitors coupled across the plurality of switches of the converter stages.

The rectifier further includes one or more controllers adapted to vary the switching frequency of the plurality of switches of the corresponding switching converter stage based on at least one of a condition of the at least one load or the input voltage and includes one or more decoupling stages, each including one or more transformers adapted to isolate the output stage from the plurality of switching converter stages. The transformer includes one or more primary windings coupled between the plurality of switching converter stages. The controller is further adapted to operate the plurality of the switches of the plurality of switching converter stages with a phase-shifted control.

According to more detailed features of the invention, the transformer further includes one or more primary windings coupled between the plurality of switching converter stages through one or more blocking capacitors. In another embodiment, the rectifier further includes a center-tap winding and rectifiers at a secondary side of the transformer. In yet another embodiment, the rectifier further includes a full-wave rectifier at a secondary side of the transformer. In still another embodiment, the rectifier further includes current doubler rectifier at a secondary side of the transformer. In a further embodiment, the rectifier further includes synchronous rectifiers at a secondary side of the transformer. In yet a further embodiment, the rectifier further includes a filter at a secondary side of the transformer.

Briefly, according to yet another embodiment of the present invention, a low input-current harmonic three-phase boost rectifier includes an input stage for receiving a three-phase input voltage in relation to a neutral node and an output stage adapted to couple to at least one load. The output stage including a plurality of output capacitors coupled to the neutral node. The rectifier further includes one or more capacitors coupled between corresponding phases of the three-phase input voltage and the neutral node and includes one or more switching converter stages, each having a plurality of switches coupled to the neutral node, the plurality of switches operating with a fixed duty cycle, the fixed duty cycle being a substantially 50% duty cycle. The one or more converter stages further include one or more boost inductors that are coupled to corresponding phases of the three-phase input voltage, one or more input bridge diodes coupled between the one or more boost inductors and the plurality of switches of the converter stages, and one or more flying capacitors coupled across the plurality of switches of the converter stages.

The rectifier further includes one or more controllers adapted to vary the switching frequency of the plurality of switches of the corresponding switching converter stage based on at least one of a condition of the at least one load or the input voltage and includes one or more decoupling stages, each including one or more transformers adapted to isolate the output stage from at least one of the one or more switching converter stages. The rectifier further includes a plurality of auxiliary switches coupled to the plurality of switches of the one or more switching converter stages through the at least one transformer. The controller is further adapted to operate the plurality of auxiliary switches according to at least one of phase-shift or pulse width modulation.

According to some of the more detailed features of the invention, the plurality of auxiliary switches coupled to the plurality of switches of the one or more switching converter stages through the at least one transformer form at least one full-bridge converter. In another embodiment, the transformer includes a primary winding coupled between the junction of the auxiliary switches and the neutral node.

BRIEF DESCRIPTION OF THE DRAWINGS

FIG. 8 shows topological stages of circuit in FIG. 6 during a switching cycle according to an embodiment of the present invention.

DETAILED DESCRIPTION OF THE INVENTION

The present invention relates to three-phase rectifier implementations that offer a low THD of the input currents and high PF along with soft-switching of the switches in a wide load range. Non-isolated and isolated implementations are described below. Non-isolated implementations may offer reduced common-mode noise and automatic balancing of the split capacitors when serially-connected downstream converters are employed. Isolated implementations may provide galvanic isolation of the output from the input side. Moreover, by employing an additional phase-shift or pulse-width-modulation (PWM) control with added switches, the isolated implementations can tightly control their output voltages to minimize unnecessary voltage ripples. Circuits may also be interleaved to reduce their current and voltage ripples.

Figure 1:
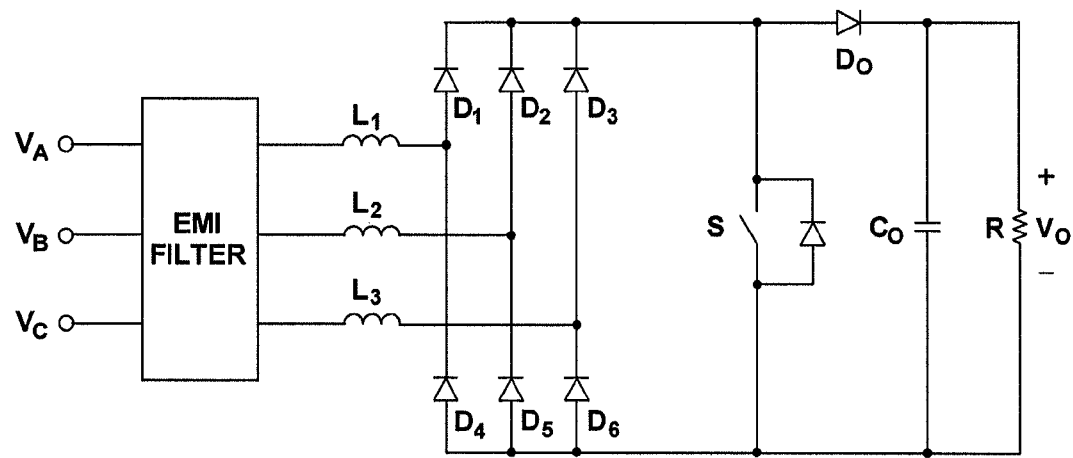
FIG. 1 shows a three-phase single-switch PFC DCM boost rectifier.
Figure 2:
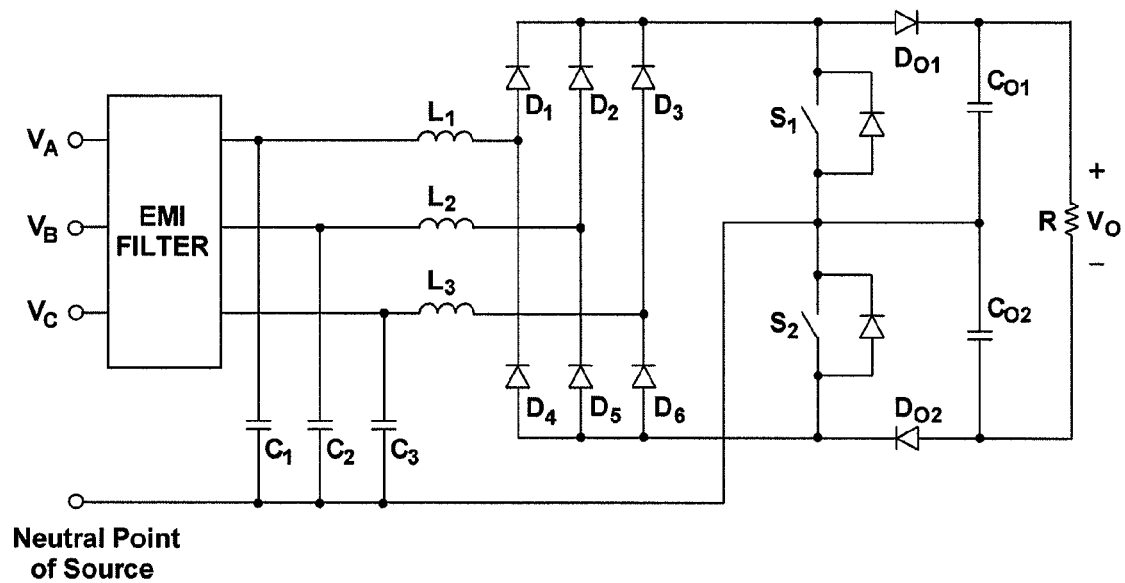
FIG. 2 shows a three-phase two-switch PFC DCM boost rectifier for power systems with neutral wire connection.
Figure 3:
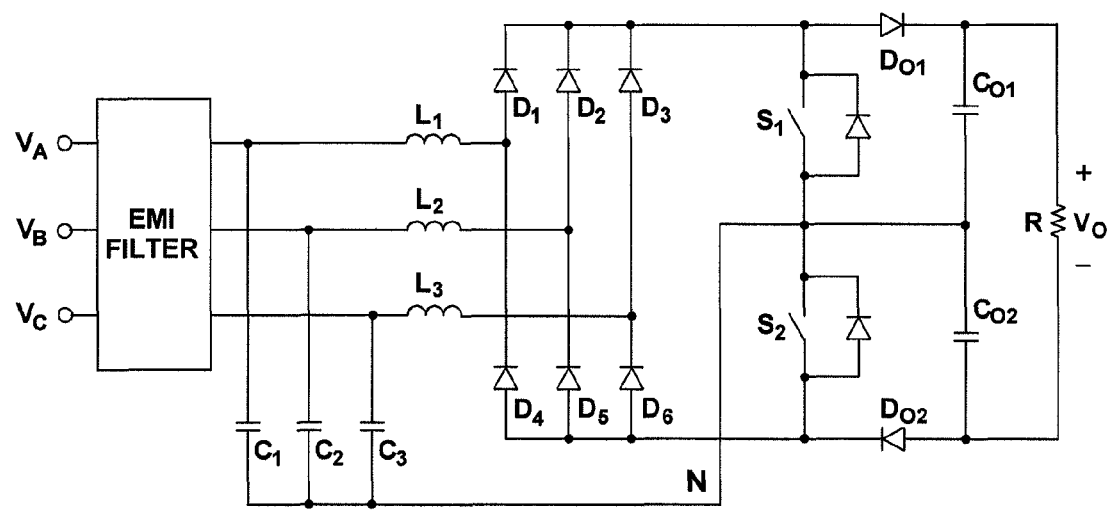
FIG. 3 shows a three-phase two-switch PFC DCM boost rectifier with virtual neutral and with split output capacitors.
Figure 4:
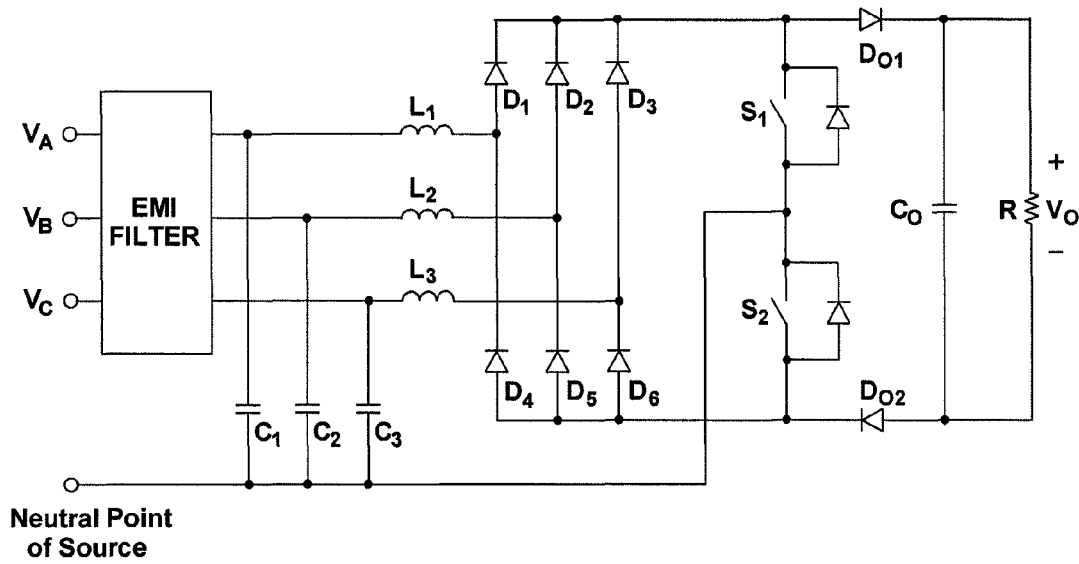
FIG. 4 shows a three-phase two-switch PFC DCM boost rectifier with neutral wire connection and with single output capacitor.
Figure 5:
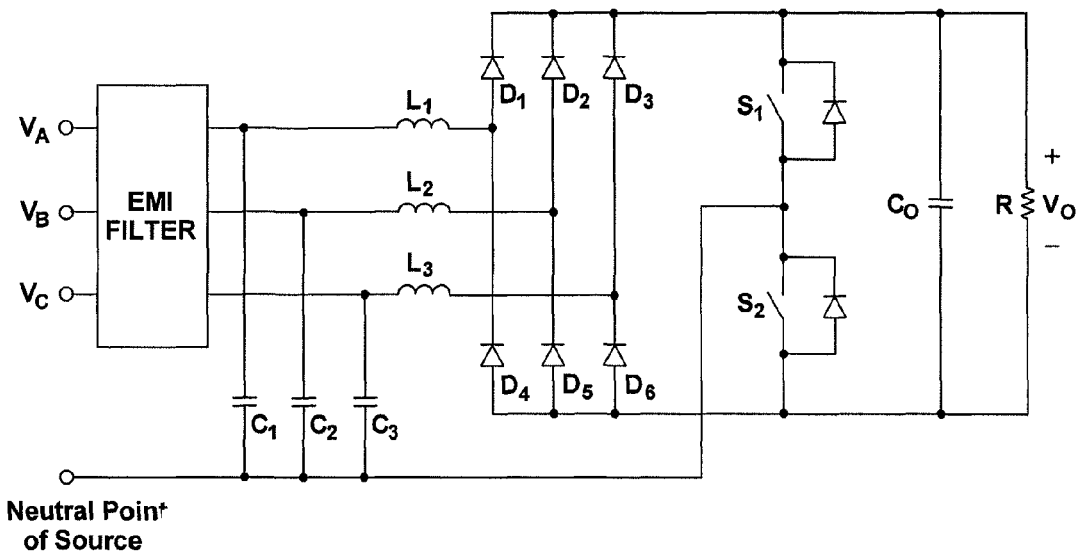
FIG. 5 shows a three-phase two-switch PFC DCM boost rectifier without output diode rectifiers.
Figure 6:
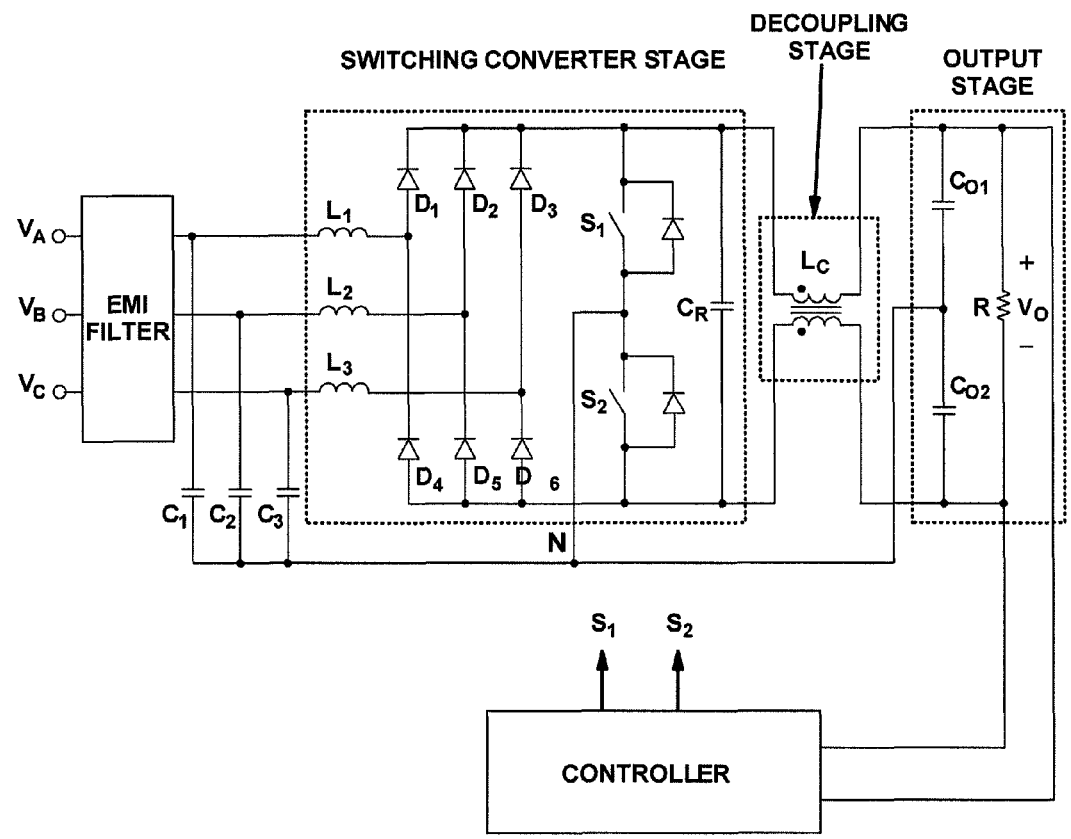
FIG. 6 shows a three-phase two-switch zero voltage switching (ZVS) PFC DCM boost rectifier according to an embodiment of the present invention.

FIG. 6 shows a block diagram of a three-phase two-switch ZVS PFC DCM low input-current harmonic boost rectifier according to an embodiment of the present invention. The input of the circuit consists of three boost inductors $L_1$, $L_2$, and $L_3$ coupled through an EMI filter to the three-phase input terminals and three capacitors $C_1$, $C_2$, and $C_3$ connected in the Y ("star") configuration. The common point of the filter capacitors N is connected to the mid-point between switches $S_1$ and $S_2$ and also to the mid-point of split output capacitors $C_{O1}$ and $C_{O2}$. Capacitor $C_R$ that is used to reset the inductor currents is connected across the serially connected switches and it is decoupled from the output by coupled inductor $L_C$.

The rectifier includes an input stage for receiving a three-phase input voltage in relation to a neutral node and an output stage adapted to couple to at least one load. The output stage includes a plurality of output capacitors $C_{O1}$ and $C_{O2}$ coupled to the neutral node N.

The rectifier further includes one or more capacitors $C_1$, $C_2$, and $C_3$ coupled between corresponding phases of the three-phase input voltage and the neutral node N and includes one or more switching converter stages, each having a plurality of switches $S_1$ and $S_2$ coupled to the neutral node N. Each switch may be a metal-oxide-semiconductor field-effect transistor (MOSFET) or an insulated gate bipolar transistor (IGBT) with an antiparallel diode.

FIG. 6 shows one switching converter stage including switches $S_1$ and $S_2$ coupled to the neutral node. Switches $S_1$ and $S_2$ operate with a fixed duty cycle of substantially 50% duty cycle. The one or more converter stages further include one or more boost inductors $L_1$, $L_2$, and $L_3$ that are coupled to corresponding phases of the three-phase input voltage, one or more input bridge diodes $D_1$-$D_6$ coupled between the one or more boost inductors and the plurality of switches of the converter stages, and one or more flying capacitors $C_R$ coupled across the plurality of switches of the converter stages.

The rectifier further includes one or more controllers adapted to vary the switching frequency of the plurality of switches based on at least one of a condition of the at least one load or the input voltage and includes one or more decoupling stages, each including one or more inductive elements, e.g., inductor $L_C$ or transformers, adapted to inductively decouple the output stage from at least one of the one or more switching converter stages.

Each of the output capacitors may be adapted to couple across at least one load and the voltages across each output capacitor may be substantially equal.

The rectifier offers a low THD of the input currents and high PF along with soft-switching of the switches in a wide load range. This is achieved by operating the boost inductors in DCM and by controlling the output voltage of rectifiers with variable-frequency control. In addition, the rectifiers exhibit a reduced common-mode noise and possess automatic balancing of the split capacitors when serially-connected downstream converters are employed.

Where the rectifier includes a plurality of switching converter stages each coupled to a corresponding one of the one or more decoupling stages, the controller may be further adapted to operate the plurality of switches of the plurality of switching converter stages in an interleaved or a parallel manner. The one or more switching converter stages may be coupled to corresponding ones of the one or more decoupling stages through one or more blocking capacitors.

The main purpose of the Y-connected capacitors $C_1$, $C_2$, and $C_3$ is to create a virtual ground, i.e., a node with the same potential as the input (source) voltage neutral that is not physically available in three-wire power systems. By connecting virtual neutral N directly to the mid-point between switches $S_1$ and $S_2$, decoupling of the three input currents is achieved. In such a decoupled circuit, the current in each of the three inductors is depended only on the corresponding phase voltage, which reduces the THD and increases the PF.

Specifically, in the circuit in FIG. 6, bridge diodes $D_1$-$D_6$ allow only the positive input voltage to deliver currents through switch $S_1$ when it is turned on and the negative input voltage to deliver currents through switch $S_2$ when switch $S_2$ is on. Switches may be turned on at a substantially zero voltage across the switches. Therefore, any boost inductor in a phase with a positive voltage half-line cycle carries positive current when switch $S_1$ is on, while any boost inductor in a phase with a negative voltage half-line cycle carries negative current when switch $S_2$ is on. During the time when switch $S_1$ is off, the stored energy in the inductor connected to the positive phase voltage is delivered to capacitor $C_R$, whereas the stored energy in the inductor connected to the negative phase voltage is delivered to capacitor $C_R$ during the time when switch $S_2$ is off.

Because every switching cycle the voltage of each terminal of capacitor $C_R$ changes with a high dV/dt, coupled inductor $L_C$ is connected between "flying" capacitor $C_R$ and output to isolate the output from these fast high-voltage transitions that usually produce unacceptable common-mode EMI noise. With coupled inductor $L_C$, the output common-mode noise is very low since it is contained in a relatively small area consisting of the $S_1$-$S_2$-$C_R$ loop. Moreover, because of the presence of coupled inductor $L_C$ that provides impedance between the output and switches $S_1$ and $S_2$, parallel/interleaving operation of multiple rectifiers is possible.

Figure 7:
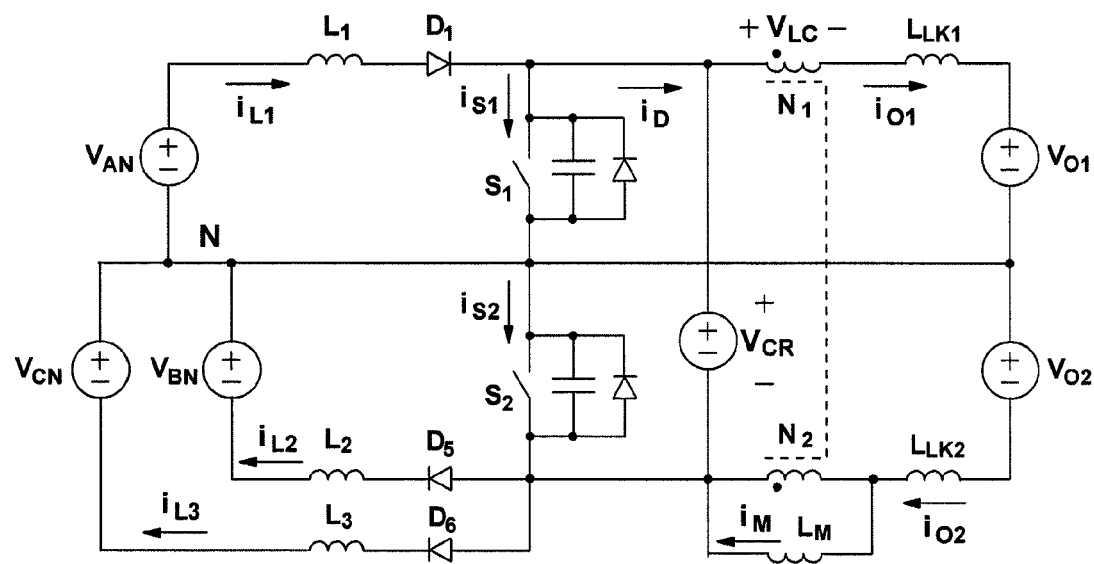
FIG. 7 shows simplified model of circuit in FIG. 6. showing reference directions of currents and voltages according to an embodiment of the present invention.

FIG. 7 shows simplified model of circuit in FIG. 6. showing reference directions of currents and voltages according to an embodiment of the present invention. To simplify the analysis of operation, it is assumed that ripple voltages of the input and output filter capacitors shown in FIG. 6 are negligible so that the voltage across the input and output filter capacitors can be represented by constant-voltage source $V_{AN}$, $V_{BN}$, $V_{CN}$, $V_{O1}$, and $V_{O2}$. Also, it is assumed that in the on state, semiconductors exhibit zero resistance, i.e., they are short circuits. However, the output capacitances of the switches are not neglected in this analysis.

Coupled inductor $L_C$ in FIG. 6 is modeled as a two-winding ideal transformer with magnetizing inductance $L_M$ and leakage inductances $L_{LK1}$ and $L_{LK2}$. Finally, since the average voltage across capacitor $C_R$ is equal to output voltage $V_O = V_{O1} + V_{O2}$, capacitor $C_R$ is modeled as a constant voltage source. The circuit diagram of the simplified rectifier is shown in FIG. 7. The reference directions of currents and voltages in FIG. 7 correspond to the 60-degree segments of a line cycle when $V_{AN} > 0$, $V_{BN} < 0$, and $V_{CN} < 0$.

Figure 9:
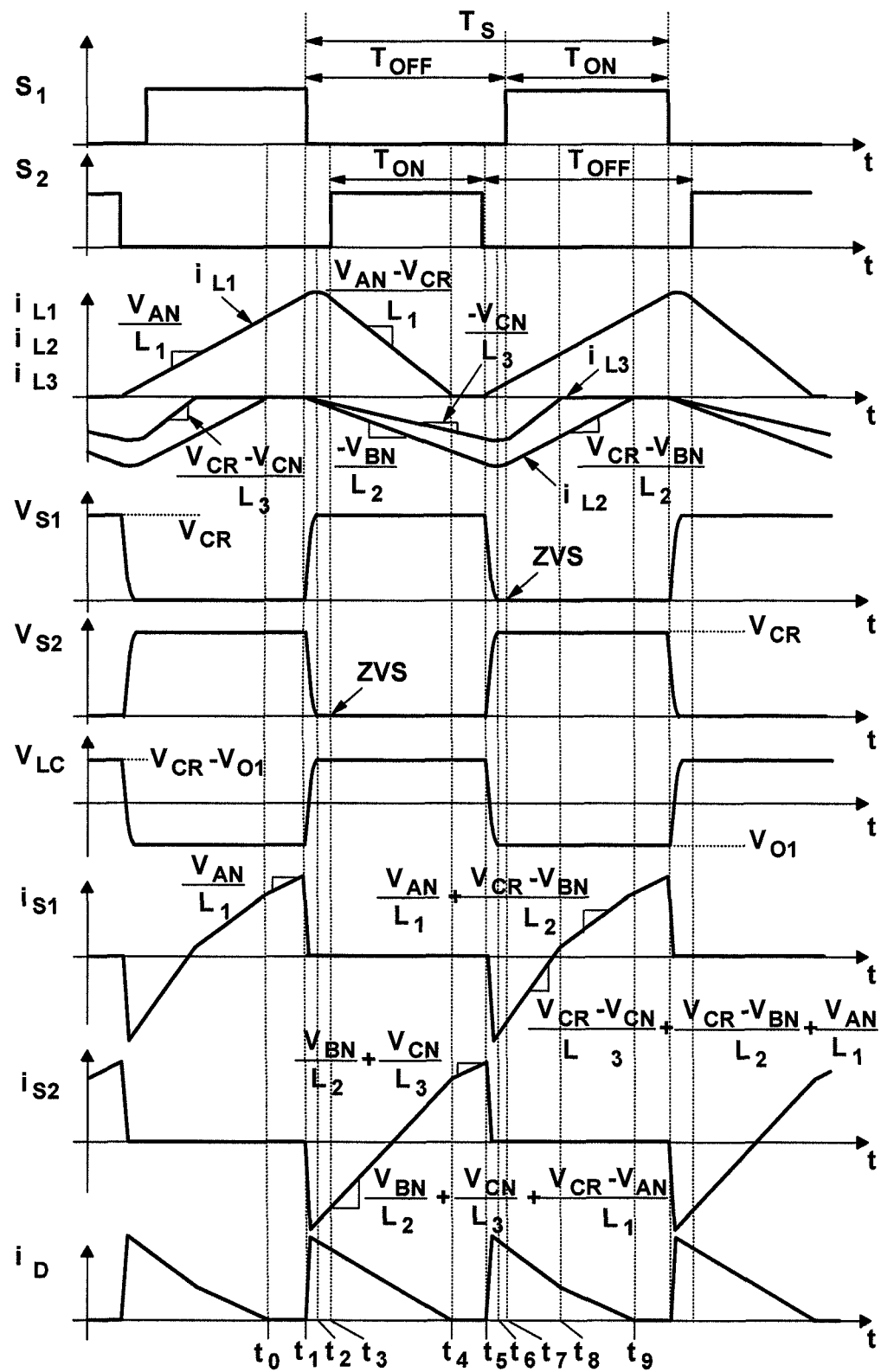
FIG. 9 shows key waveforms of circuit in FIG. 6 during a switching cycle according to an embodiment of the present invention.

To further facilitate the explanation of the operation, FIG. 8 shows topological stages of the circuit in FIG. 7 during a switching cycle according to an embodiment of the present invention, whereas FIG. 9 shows the power-stage key waveforms according to an embodiment of the present invention.

As can be seen from the gate-drive timing diagrams of switches $S_1$ and $S_2$ in FIG. 9, in the circuit in FIG. 6, switches $S_1$ and $S_2$ operate in a complimentary fashion with a short dead time between the turn-off of one switch and the turn-off of the other. With this gating strategy, both switches can achieve ZVS. However, to maintain ZVS for a varying input voltage and/or output load, the rectifier employs a variable switching frequency control.

The minimum frequency is determined by the full load and minimum input voltage while the maximum frequency is determined by the light load and maximum input voltage. If necessary, the rectifier can operate in a controlled burst mode or pulse skip mode at no load or at very light load, to avoid unnecessarily high-frequency operation. It should be noted that other control strategies could also be applied to this circuit, including constant-frequency PWM control. However, with the PWM control, ZVS cannot be maintained.

As shown in FIGS. 8(a) and 9, before switch $S_1$ is turned off at $t=T_1$, inductor current $i_{L1}$ flows through switch $S_1$. The slope of inductor current $i_{L1}$ is equal to $V_{AN}/L_1$ and the peak of the inductor current at $t=T_1$ is approximately $$I_{L1(PK)} = \frac{V_{AN}}{L_1} \times \frac{T_S}{2}, \qquad (1)$$

where $V_{AN}$ is line-to-neutral voltage and $T_S$ is the switching period. Because the dead time between turn-off of switch $S_1$ and turn-on of switch $S_2$ is very small in comparison with switching period $T_S$, the effect of the dead time is neglected in Eq. (1). During the period between $T_0$ and $T_1$, current $i_{O1}$ decreases by the rate as $-V_{O1}/(L_M+L_{LK1})$ while current $i_{O2}$ increases by the rate as $(V_{CR}-V_{O1})/(L_M+L_{LK2})$. Magnetizing current $i_M$ is the difference between currents $i_{O1}$ and $i_{O2}$.

It should be noted that the magnetizing inductance value of coupled inductor $L_M$ is designed to be sufficiently large so that the ripple current of the coupled inductor does not significantly affect rectifier operation. As shown in FIG. 6, the two windings of inductor $L_C$ are coupled in such a way as to cancel the magnetic fluxes from the differential current of the two windings so that the large magnetizing inductance can be obtained by a small gap in the core without saturation. Since the effect of currents $i_{O1}$ and $i_{O2}$ is negligible, they are not further discussed, although they are shown in the topological stages in FIG. 8.

At $t=T_1$, when, switch $S_1$ is turned off, inductor current $i_{L1}$ starts charging the output capacitance of switch $S_1$, as shown in FIG. 8(b). Because the sum of the voltages across switch $S_1$ and switch $S_2$ is clamped to the "flying" capacitor voltage $V_{CR}$, the output capacitance of switch $S_2$ discharges at the same rate as the charging rate of the output capacitance of switch $S_1$. This period ends when the output capacitance of switch $S_2$ is fully discharged and the anti-parallel body diode of switch $S_2$ starts to conduct at $t=T_2$, as shown in FIG. 8(c) and FIG. 9.

Because the body diode of switch $S_2$ is forward biased, inductor currents $i_{L2}$ and $i_{L3}$ begin to linearly increase. At $t=T_3$, switch $S_2$ is turned on with ZVS and inductor currents $i_{L2}$ and $i_{L3}$ are commutated from the antiparallel diode of switch $S_2$ to the switch, as illustrated in FIG. 8(d). This period ends when inductor current $i_{L1}$ decreases to zero at $t=T_4$. To maintain DCM operation, the time period between $t=T_3$ and $t=T_4$ is less than one-half of switching period $T_S$ which means that the rising slope of inductor current $i_{L1}$ should be smaller than its falling slope. As a result, minimum voltage $V_{CR(MIN)}$ across "flying" capacitor $C_R$, which is equal to output voltage. $V_O$, is $$V_{CR(MIN)} = 2 \times V_{AN(PK)} = \frac{2\sqrt{2}}{\sqrt{3}} \times V_{L-L,RMS} \qquad (2)$$

where $V_{AN-PK}$ is the peak line-to-neutral voltage.

It also should be noted that because during the $T_2$-$T_4$ interval inductor currents $i_{L2}$ and $i_{L3}$ flow in the opposite direction from inductor current the average current through switch $S_2$ is reduced so that the switches in the proposed rectifier exhibit reduced power losses.

During the period between $t=T_4$ and $t=T_5$, inductor currents $i_{L2}$ and $i_{L3}$ continue to flow through switch $S_2$, as illustrated in FIG. 8(e). As shown in FIG. 9, the slopes of inductor currents $i_{L2}$ and $i_{L3}$ during this period are equal to $V_{BN}/L_2$ and $V_{CN}/L_3$, respectively. The peaks of the inductor currents at the moment when switch $S_2$ turns off at $t=T_5$ are approximately $$I_{L2(PK)} = \frac{V_{BN}}{L_2} \times \frac{T_S}{2} \text{ and} \qquad (3)$$

$$I_{L3(PK)} = \frac{V_{CN}}{L_3} \times \frac{T_S}{2}. \qquad (4)$$

As it can be seen in Eqs. (1), (3), and (4), the peak of each inductor current is proportional to its corresponding input voltage.

After switch $S_2$ is turned off at $t=T_5$, inductor currents $i_{L2}$ and $i_{L3}$ start to simultaneously charge the output capacitance of switch $S_2$ and discharge the output capacitance of switch $S_1$, as shown in FIG. 8(f). This period ends at $t=T_6$ when the output capacitance of switch $S_1$ is fully discharged and its anti-parallel diode starts conducting, as shown in FIG. 8(g) and FIG. 9. After $t=T_6$, switch $S_1$ can be turned on with ZVS. In FIG. 9, switch $S_1$ is turned on at $t=T_7$. As shown in FIG. 8(h), once switch $S_1$ is on, increasing inductor current $i_{L1}$ flows in the opposite direction from inductor currents $i_{L2}$ and $i_{L3}$ through switch $S_1$ so that switch $S_1$ carries only the difference of current $i_{L1}$ and the sum of currents $i_{L2}$ and $i_{L3}$. This period ends when inductor current $i_{L3}$ decreases to zero at $t=T_8$. During period $T_8$-$T_9$, decreasing inductor current $i_{L2}$ continues to flow through switch $S_1$, as shown in FIG. 8(i). Finally, after inductor current $i_{L2}$ reaches zero at $t=T_9$, a new switching cycle begins, as shown in FIG. 8(j).

Since in the circuit shown in FIG. 6 the charging current of each boost inductor during the time when the related switch is on is proportional to its corresponding phase voltage and its discharging current proportional to the difference of "flying" capacitor voltage $V_{CR}$ and the corresponding phase voltage, as shown in the inductor-current waveforms in FIG. 9, average inductor current $<I_{L(AVG)}>_{T_S}$ of each boost inductor during a switching cycle is $$\langle I_{L(AVG)} \rangle_{T_S} = \frac{T_S}{8L} \left( \frac{V_{CR} \times \sqrt{2} V_{L-N,RMS} \sin\omega t}{V_{CR} - \sqrt{2} V_{L-N,RMS} \sin\omega t} \right), \qquad (5)$$

where $L=L_1=L_2=L_3$, and $\omega$ is the angular frequency of the line voltage.

By defining input-to-output voltage conversion ratio M as $$M = \frac{V_o}{\sqrt{2} V_{L-N,RMS}} \qquad (6)$$

and recalling that the voltage across flying capacitor $C_R$ is equal to output voltage $V_O$, i.e., $V_{CR}=V_O$, average inductor current $<I_{L(AVG)}>_{T_S}$ in Eq. (5) can be rewritten as $$\langle I_{L(AVG)} \rangle_{T_S} = \frac{V_o T_S}{8L} \left( \frac{\sin\omega t}{M - \sin\omega t} \right). \qquad (7)$$

It should be noted that expression for the average inductor current $I_{L(AVG)}$ in Eq. (7) is exactly the same as that for the average inductor current of the single-phase constant-frequency boost PFC operating in the DCM. The current distortion of the average inductor current in Eq. (7) is brought about by the denominator term (M−sin ωt) and it is dependent on voltage-conversion ratio M.

The harmonic content of the average inductor currents for various Ms is summarized in Table I. As can be seen from Table I, the $3^{rd}$ harmonic is the dominant distortion component. However, since in the three-wire power systems, the neutral wire is not available (or not connected) the line currents cannot contain the triplen harmonics (the $3^{rd}$ harmonic and the odd multiples of the 3rd harmonic). As a result, the proposed circuit exhibits a very low THD and high PF since according to Table I the remaining harmonics contribute less than 1% of total current distortion. It should be noted that the line currents cannot contain the third harmonic, the voltages of filter capacitors $C_1$-$C_3$ should contain the $3^{rd}$ harmonic and automatically eliminate the $3^{rd}$ harmonic of the inductor currents.

Figure 10:
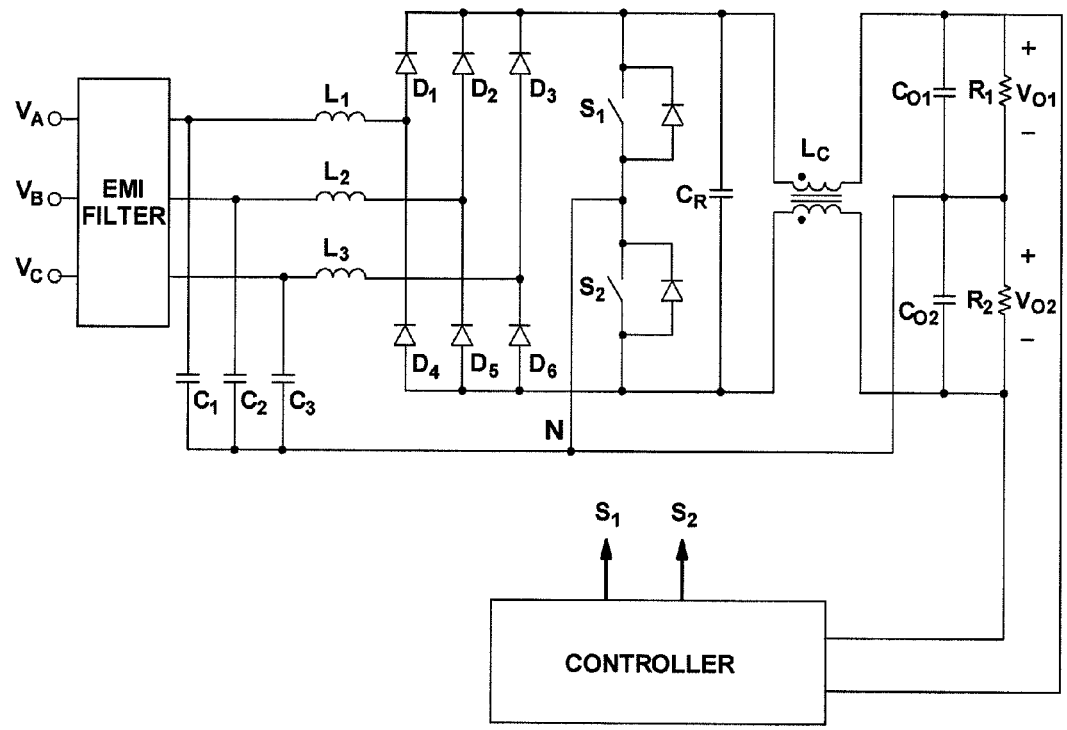
FIG. 10 shows a three-phase two-switch ZVS PFC DCM boost rectifier with two independent loads according to an embodiment of the present invention.

The circuit can be implemented in many other embodiments. For example, FIG. 10 is an implementation with two independent loads according to an embodiment of the present invention. Since the proposed two-switch rectifier automatically balances the voltages across the two output capacitors, no additional voltage-balancing circuit is required. Natural voltage-balancing is achieved because in the circuit in FIG. 10 the average voltages across switches $S_1$ and $S_2$ are equal to voltages $V_{O1}$ and $V_{O2}$ across capacitors $C_{O1}$ and $C_{O2}$, respectively, since the average voltages across the windings of inductor $L_C$ are zero. Because the switches are operated with approximately 50% duty cycle, their average voltages are equal to $V_{CR}/2$ so that $V_{O1}=V_{O2}=V_{CR}/2$.

Figure 11:
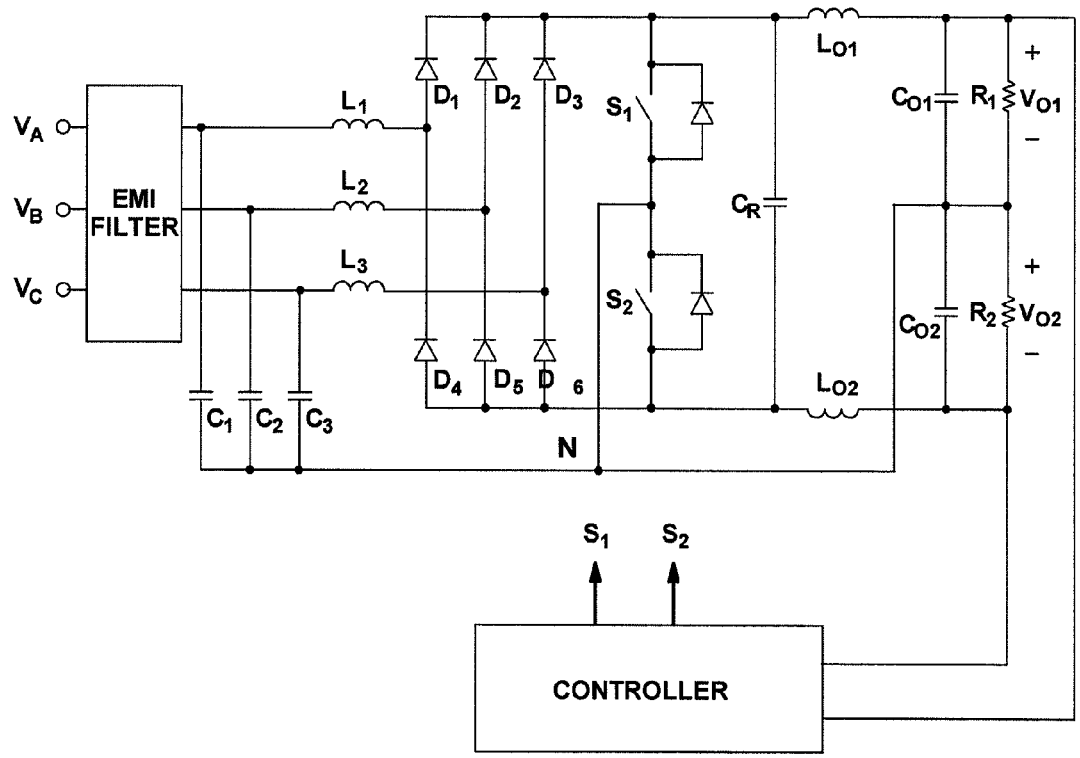
FIG. 11 shows a three-phase two-switch ZVS PFC DCM boost rectifier with two independent inductors and two independent loads according to an embodiment of the present invention.
Figure 12:
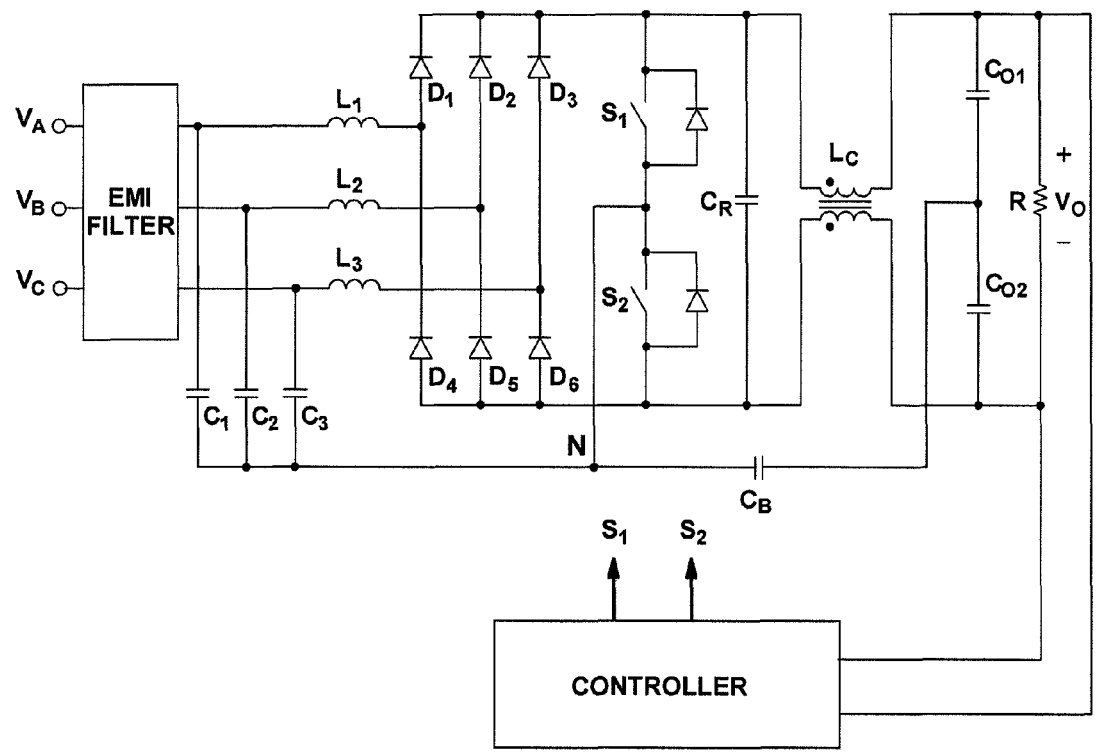
FIG. 12 shows a three-phase two-switch ZVS PFC DCM boost rectifier with a blocking capacitor between the virtual neutral and the midpoint of the two split output capacitors according to an embodiment of the present invention.

The embodiment in FIG. 6 can also be implemented with two independent inductors as shown in FIG. 11 according to an embodiment of the present invention, as well as with blocking capacitor $C_B$ as shown in FIG. 12 according to an embodiment of the present invention. The blocking capacitor is coupled between the neutral node and the output capacitors. By adding blocking capacitor $C_B$ as shown in FIG. 12, any DC current circulating from the node between switches $S_1$ and $S_2$ to the node between capacitors $C_{O1}$ and $C_{O2}$ can be prevented.

Figure 13:
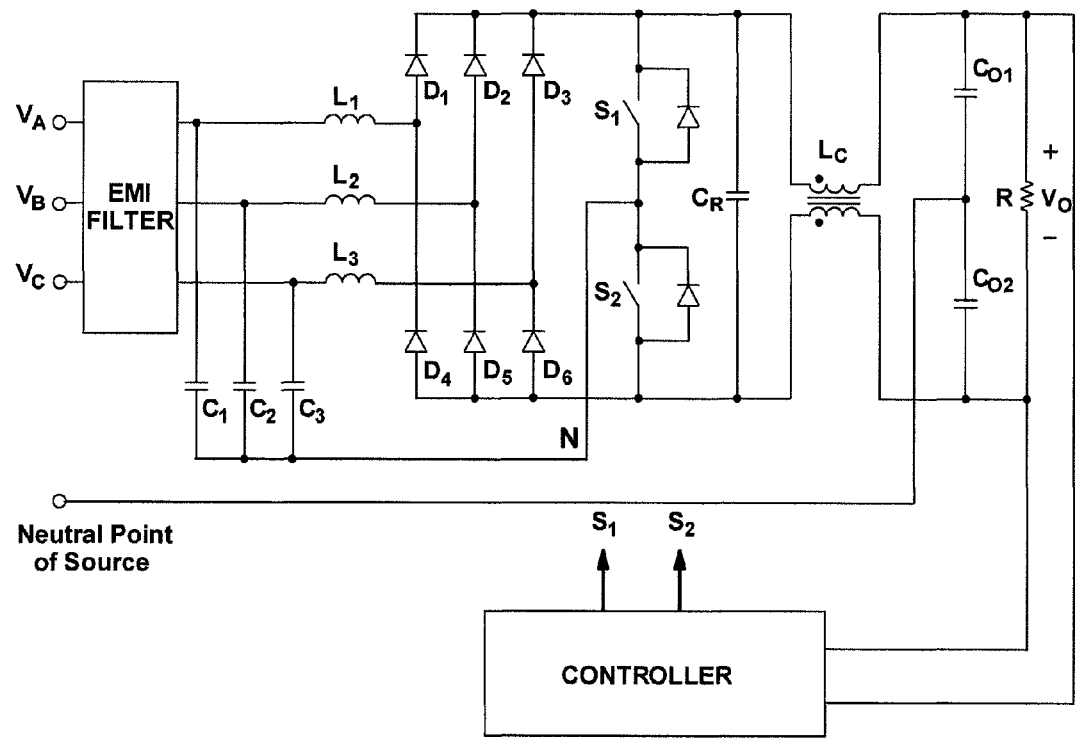
FIG. 13 shows a three-phase two-switch ZVS PFC DCM boost rectifier with a coupling between the input source neutral and the midpoint of the two split output capacitors according to an embodiment of the present invention.

FIG. 13 shows the node between capacitors $C_{O1}$ and $C_{O2}$ can be connected to the neutral wire of the input source if it is a three-phase four-wire system according to an embodiment of the present invention. The circuit shown in FIG. 13 is specifically useful for a non-isolated uninterruptible-power-supply (UPS) system that requires a connection to the neutral wire of the three-phase input source to provide a commonly grounded ac voltage output.

Figure 14:
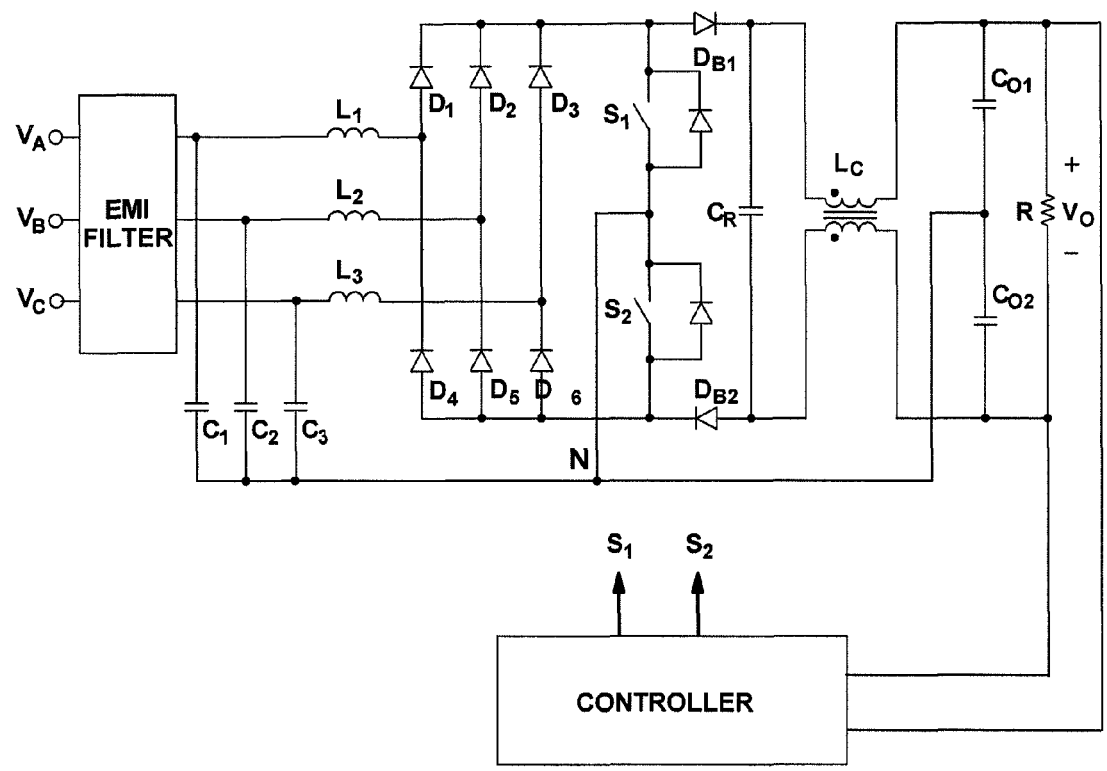
FIG. 14 shows a three-phase two-switch ZVS PFC DCM boost rectifier with a coupled inductor and two blocking diodes according to an embodiment of the present invention.

FIG. 14 shows the embodiment in FIG. 6 can also be, implemented with two blocking diodes according to an embodiment of the present invention. The blocking diodes may be coupled between the plurality of switches and the one or more flying capacitors. By adding two extra diodes $D_{B1}$ and $D_{B2}$, a shoot-through failure of the switches by an accidental overlapping of the gate signals can be prevented.

Since the embodiments of the circuit are based on a boost type rectifier, there is a charging current at the moment when the power supply is connected to the input source or at the moment when the input voltage is recovered from its drop out.

Figure 15:
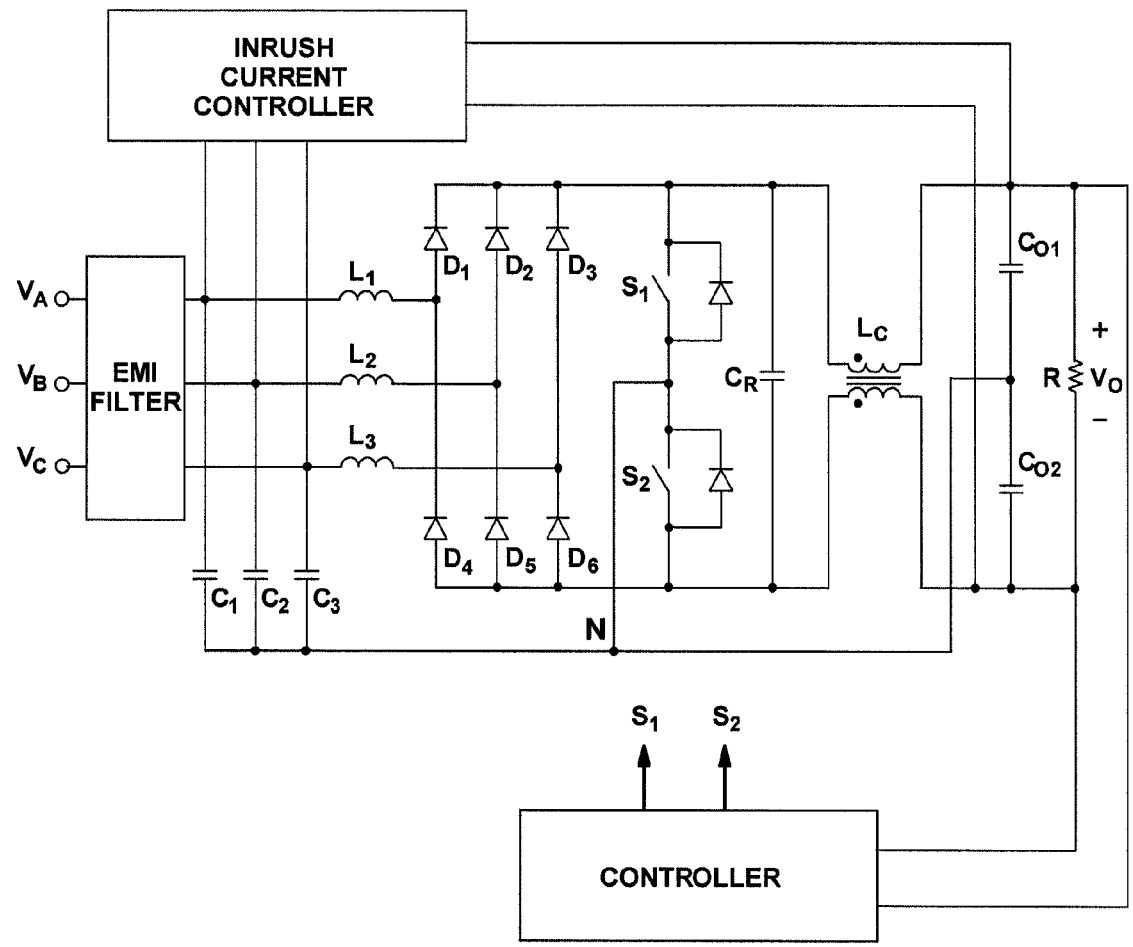
FIG. 15 shows a three-phase two-switch ZVS PFC DCM boost rectifier with a inrush current controller according to an embodiment of the present invention.

FIG. 15 shows an inrush current control circuit can be added to prevent and/or bypass high spike currents according to an embodiment of the present invention. The inrush current control circuit may be coupled between the input voltages and the capacitors.

Figure 16:
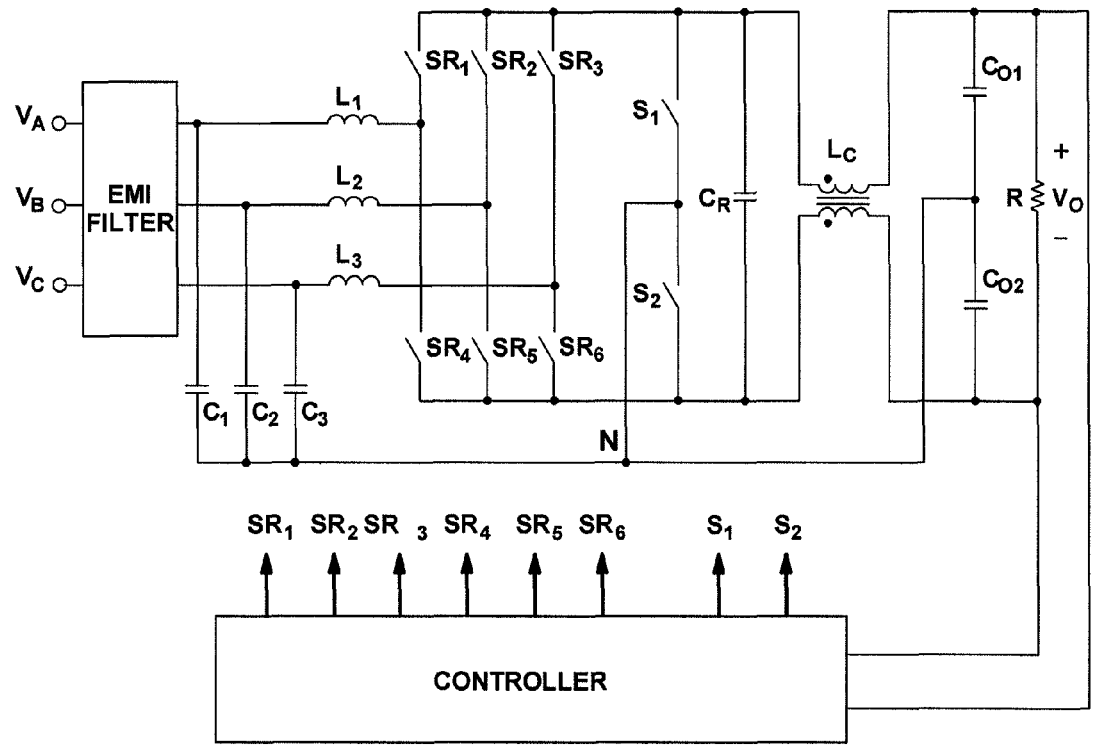
FIG. 16 shows a three-phase two-switch ZVS PFC DCM boost rectifier where the input bridge rectifier consists of controlled switches according to an embodiment of the present invention.

FIG. 16 shows the embodiment in FIG. 6 can also be implemented with six controlled switches instead of six input diodes according to an embodiment of the present invention. By employing six switches $SR_1$-$SR_6$, bi-directional energy flow is possible, which is a desirable function to compensate the phase angle of the source current if necessary.

Figure 17:
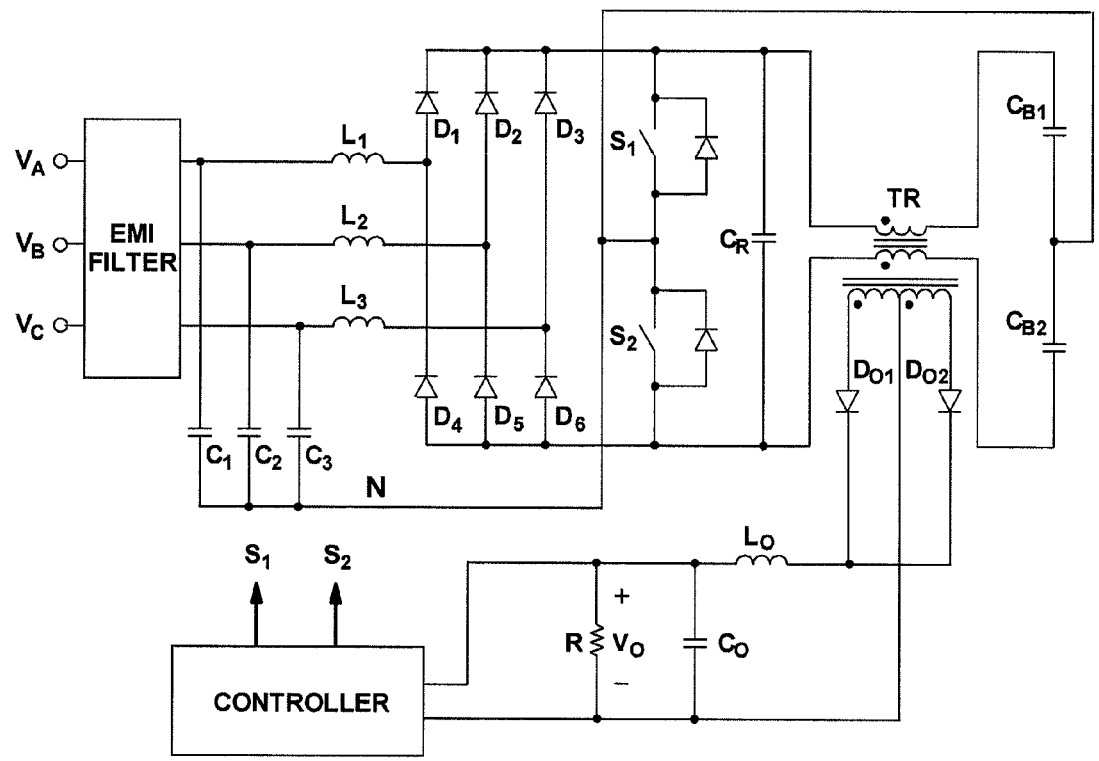
FIG. 17 shows a three-phase two-switch isolated ZVS PFC DCM boost rectifier with a two-primary-winding transformer according to an embodiment of the present invention.

FIG. 17 shows an embodiment with an isolated output according to an embodiment of the present invention. The primary side of the isolated circuit in FIG. 17 is similar to the circuit shown in FIG. 6 except that coupled inductor $L_C$ in the circuit shown in FIG. 6 is replaced by transformer TR that consists of two primary windings and a center-tap secondary winding. At the secondary side of transformer TR, rectifiers $D_{O1}$ and $D_{O2}$ and output filter components $L_O$ and $C_O$ are coupled between the secondary winding of transformer TR and the output.

Figure 18:
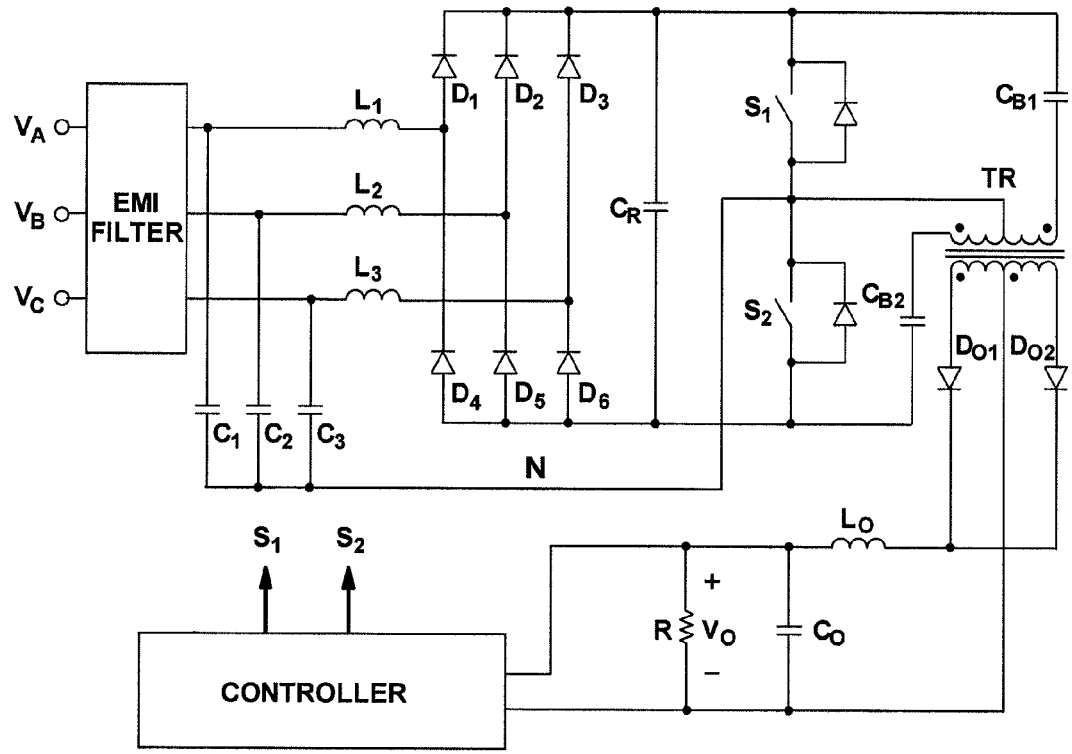
FIG. 18 shows a three-phase two-switch isolated ZVS PFC DCM boost rectifier with a center-tap-primary-winding transformer according to an embodiment of the present invention.

FIG. 18 shows an embodiment with isolated transformer TR that consists of a center-tap primary winding and a center-tap secondary winding according to an embodiment of the present invention. To achieve high PF and low THD of the circuit, the switching frequency and duty cycle of switches $S_1$ and $S_2$ should be nearly constant during a half cycle of the line frequency. As a result, the bandwidth of the employed control feedback should be much lower than the line frequency, which produces significant ripple of the output voltage at rectified line frequency, i.e., six times higher frequency than the fundamental frequency of the line.

In general, the majority of power supplies has two cascaded stages which are a primary PFC rectifier stage and a secondary isolated dc-dc converter stage. As a result, although the output voltage of the primary PFC rectifier contains a rectified line frequency voltage ripple, the secondary isolated dc-dc converter stage can regulate its output voltage by its own high frequency bandwidth feedback controller. To combine the functions of the two stages into a single stage, a tight regulation of the output voltage is unavoidable.

Figure 19:
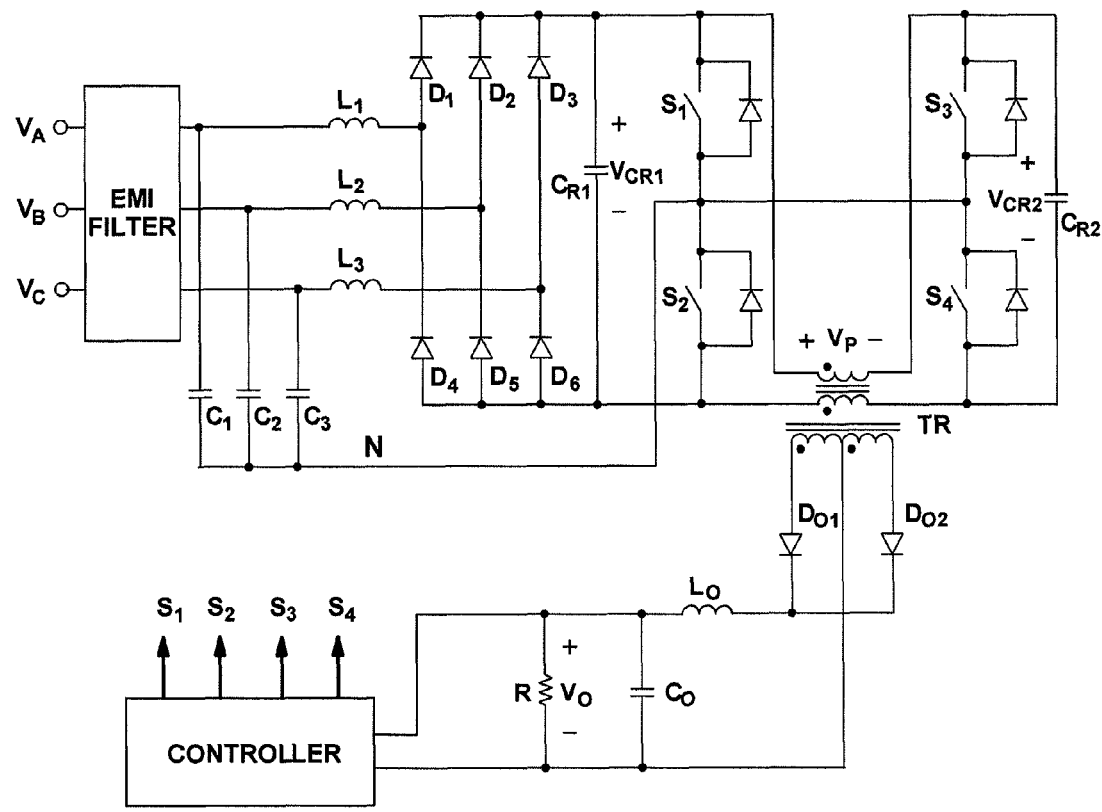
FIG. 19 shows a three-phase four-switch isolated ZVS PFC DCM boost-input full-bridge-output rectifier with a two-primary-winding transformer according to an embodiment of the present invention.

FIG. 19 shows a three-phase four-switch isolated ZVS PFC DCM boost-input full-bridge-output rectifier with a two-primary-winding transformer according to an embodiment of the present invention which provides tightly controlled isolated output. The rectifier includes an input stage for receiving a three-phase input voltage in relation to a neutral node and an output stage adapted to couple to at least one load. The output stage including a plurality of output capacitors coupled to the neutral node.

The rectifier further includes one or more capacitors coupled between corresponding phases of the three-phase input voltage and the neutral node and includes one or more switching converter stages, each having a plurality of switches coupled to the neutral node, the plurality of switches operating with a fixed duty cycle, the fixed duty cycle being a substantially 50% duty cycle. The one or more converter stages further include one or more boost inductors that are coupled to corresponding phases of the three-phase input voltage, one or more input bridge diodes coupled between the one or more boost inductors and the plurality of switches of the converter stages, and one or more flying capacitors coupled across the plurality of switches of the converter stages.

The rectifier further includes one or more controllers adapted to vary the switching frequency of the plurality of switches of the corresponding switching converter stage based on at least one of a condition of the at least one load or the input voltage and includes one or more decoupling stages, each including one or more transformers adapted to isolate the output stage from at least one of the one or more switching converter stages.

The rectifier further includes a plurality of auxiliary switches $S_3$ and $S_4$ coupled to the plurality of switches of the one or more switching converter stages through the at least one transformer. The controller is further adapted to operate the plurality of auxiliary switches according to at least one of phase-shift or pulse width modulation.

The plurality of auxiliary switches may form at least one full-bridge converter. The transformer may include a primary winding coupled between the junction of the auxiliary switches and the neutral node. The transformer may include one or more primary windings coupled between the switching converter stage through one or more blocking capacitors to the neutral node.

Figure 20:
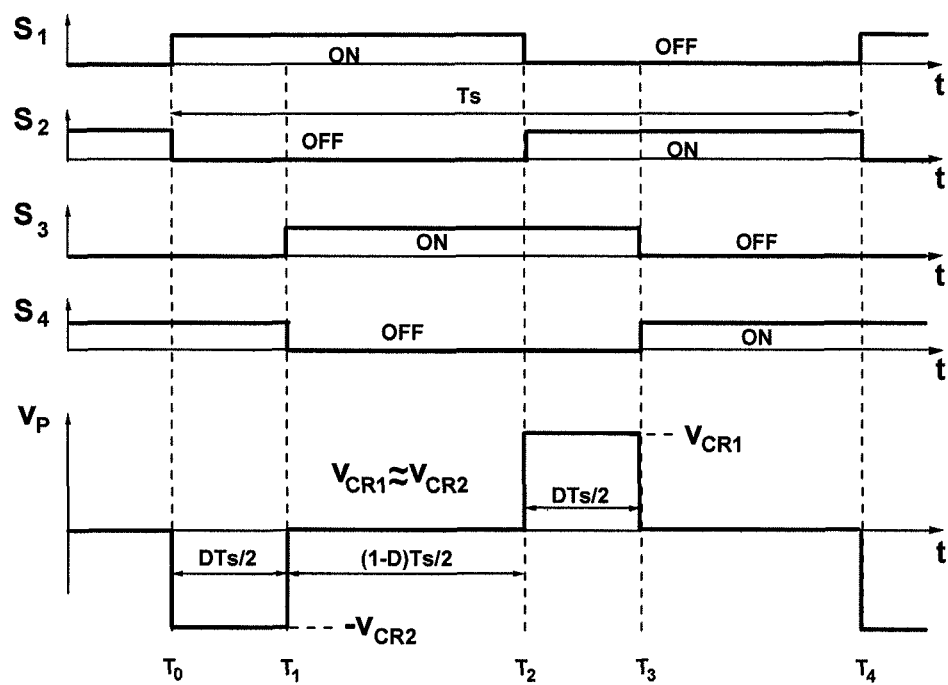
FIG. 20 shows phase-shift-controlled gating waveforms of the four switches of the circuit in FIG. 19 during a switching cycle according to an embodiment of the present invention.
Figure 21:
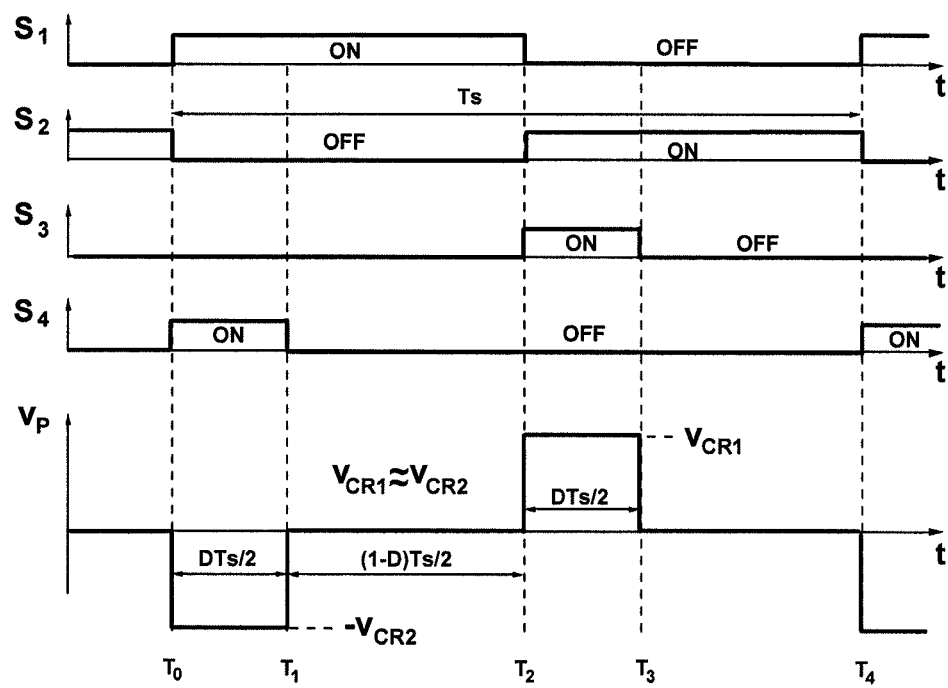
FIG. 21 shows PWM gating waveforms of the four switches of the circuit in FIG. 19 during a switching cycle according to an embodiment of the present invention.

By adding extra switches $S_3$ and $S_4$ which operate with main switches $S_1$ and $S_2$ as shown in the timing diagram in FIGS. 20 and 21 according to an embodiment of the present invention, the isolated implementation can achieve tight control of its output voltage in addition to high PF and low THD. FIG. 20 shows gating waveforms of switches $S_1$-$S_4$. The switching of $S_1$ and $S_2$ occurs at time $T_0$ while the switching of $S_3$ and $S_4$ occurs at time $T_1$. The phase shift between the two switching events creates PWM voltage waveform $V_P$ across transformer TR as shown in FIG. 20. Although all switches $S_1$-$S_4$ operate with a slowly varying switching frequency and near 50% duty cycle to achieve high PF and low THD, the proposed control method provides an additional control by varying the phase shift angle which can tightly regulate the output voltage.

Figure 22:
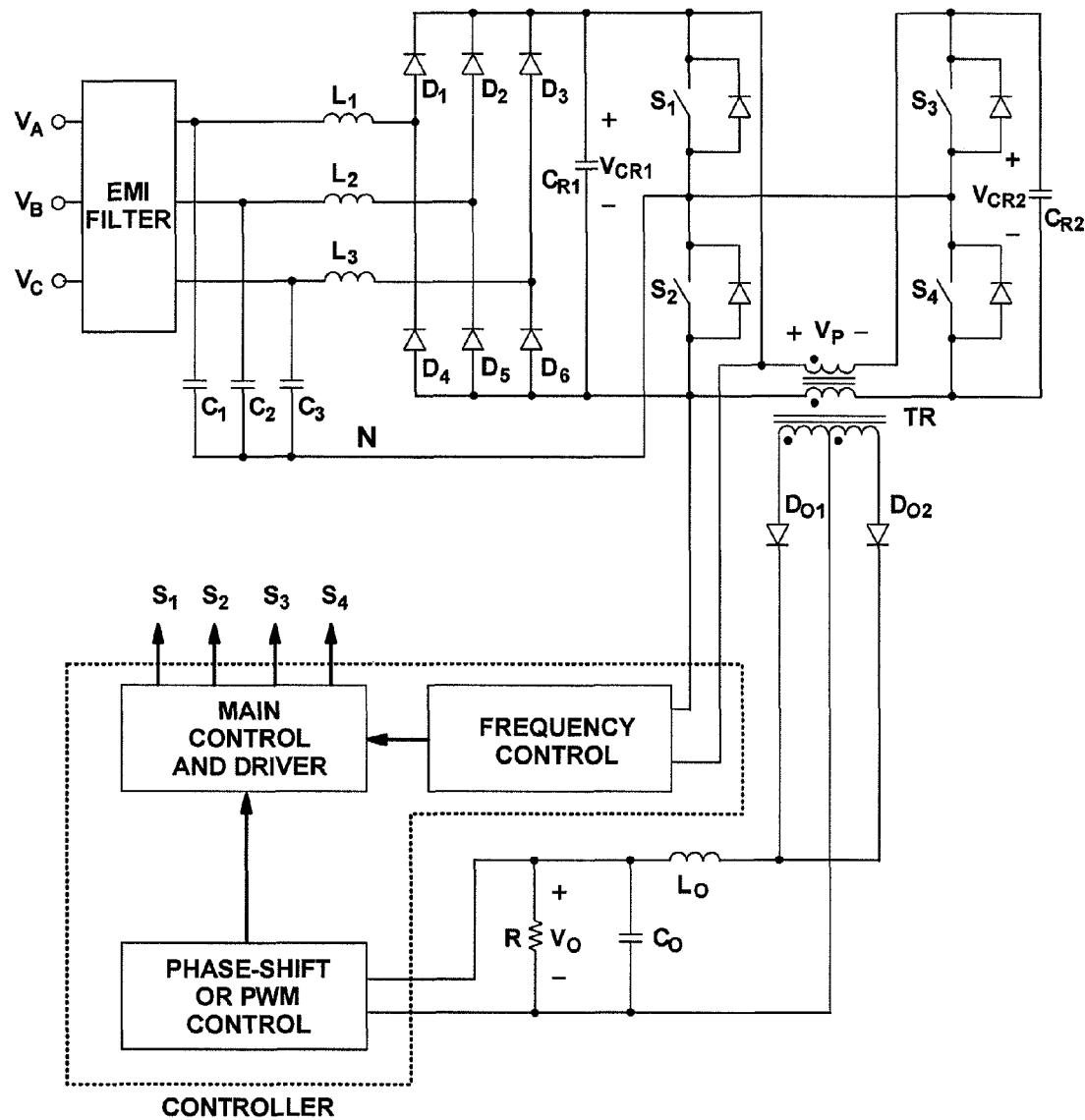
FIG. 22 shows a block diagram of the controller coupled to the circuit in FIG. 19 according to an embodiment of the present invention.

FIG. 21 shows another control scheme that employs a PWM gating of switches $S_3$ and $S_4$. An example of the proposed control schemes is depicted at a simplified block diagram in FIG. 22. The voltage across flying capacitor $C_{R1}$ is controlled by the low bandwidth frequency control while the output voltage is controlled by the high bandwidth phase-shift or PWM control. It should be noted that the voltage across flying capacitor $C_{R2}$ or the output voltage can be controlled by the low bandwidth frequency control instead of the voltage across flying capacitor $C_{R1}$.

Figure 23:
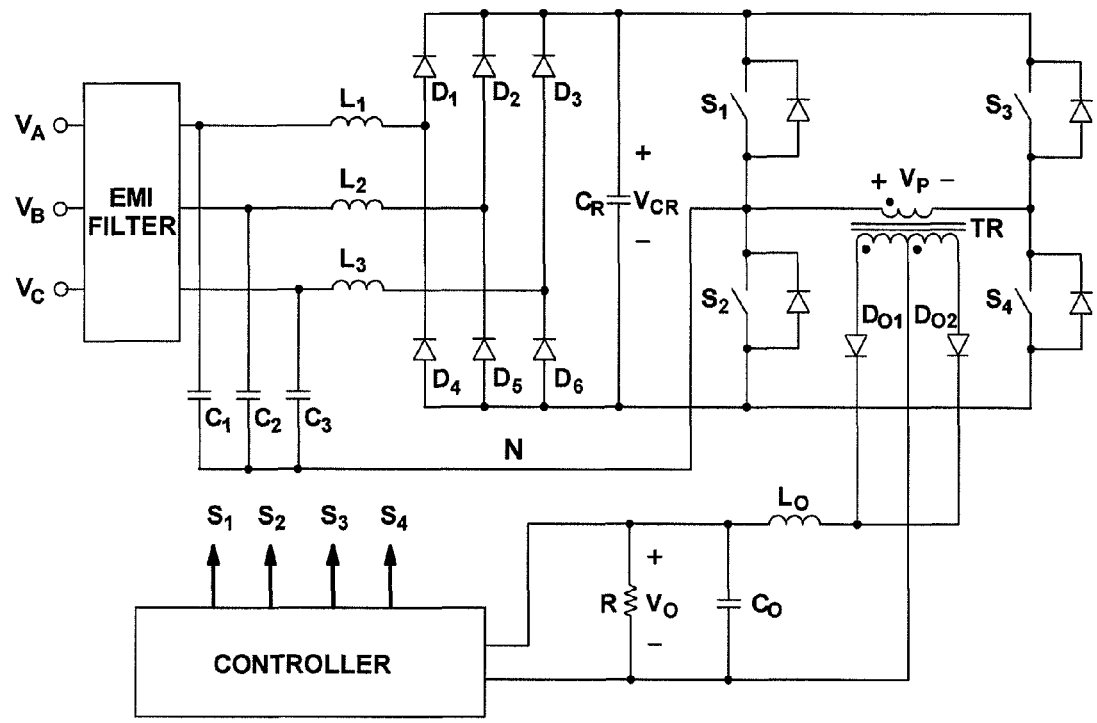
FIG. 23 shows a three-phase four-switch isolated ZVS PFC DCM boost-input full-bridge-output rectifier with a single-primary-winding transformer according to an embodiment of the present invention.
Figure 24:
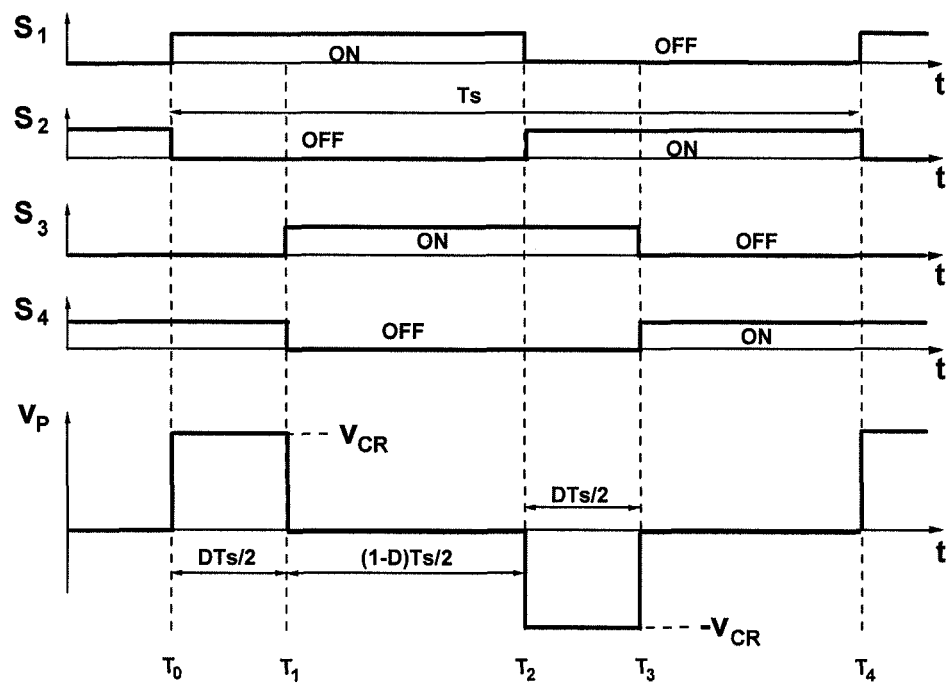
FIG. 24 shows phase-shift gating waveforms of the four switches of the circuit in FIG. 23 during a switching cycle according to an embodiment of the present invention.
Figure 25:
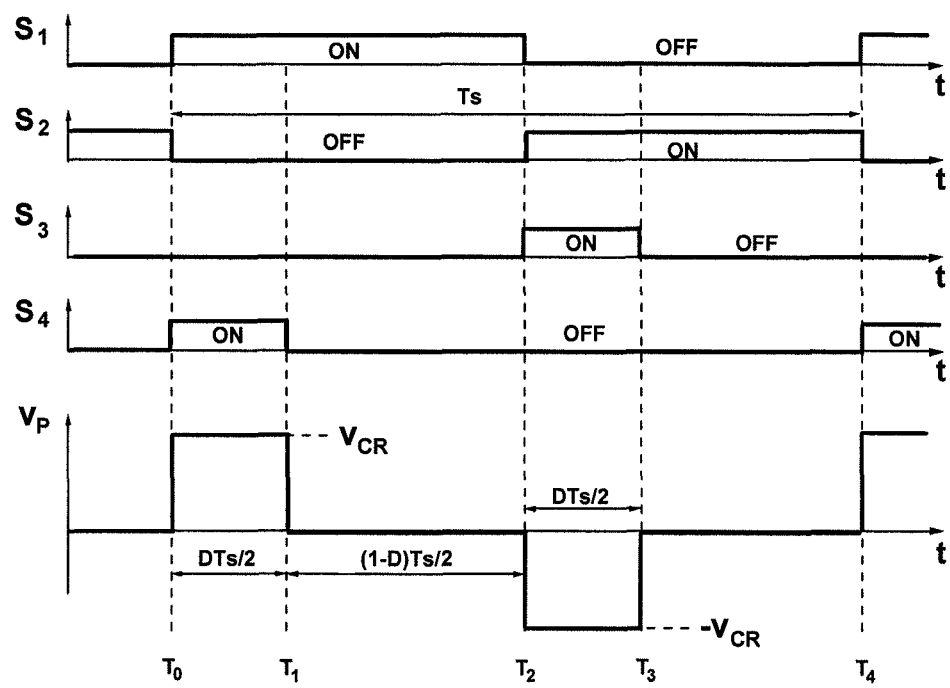
FIG. 25 shows PWM gating waveforms of the four switches of the circuit in FIG. 23 during a switching cycle according to an embodiment of the present invention.
Figure 26:
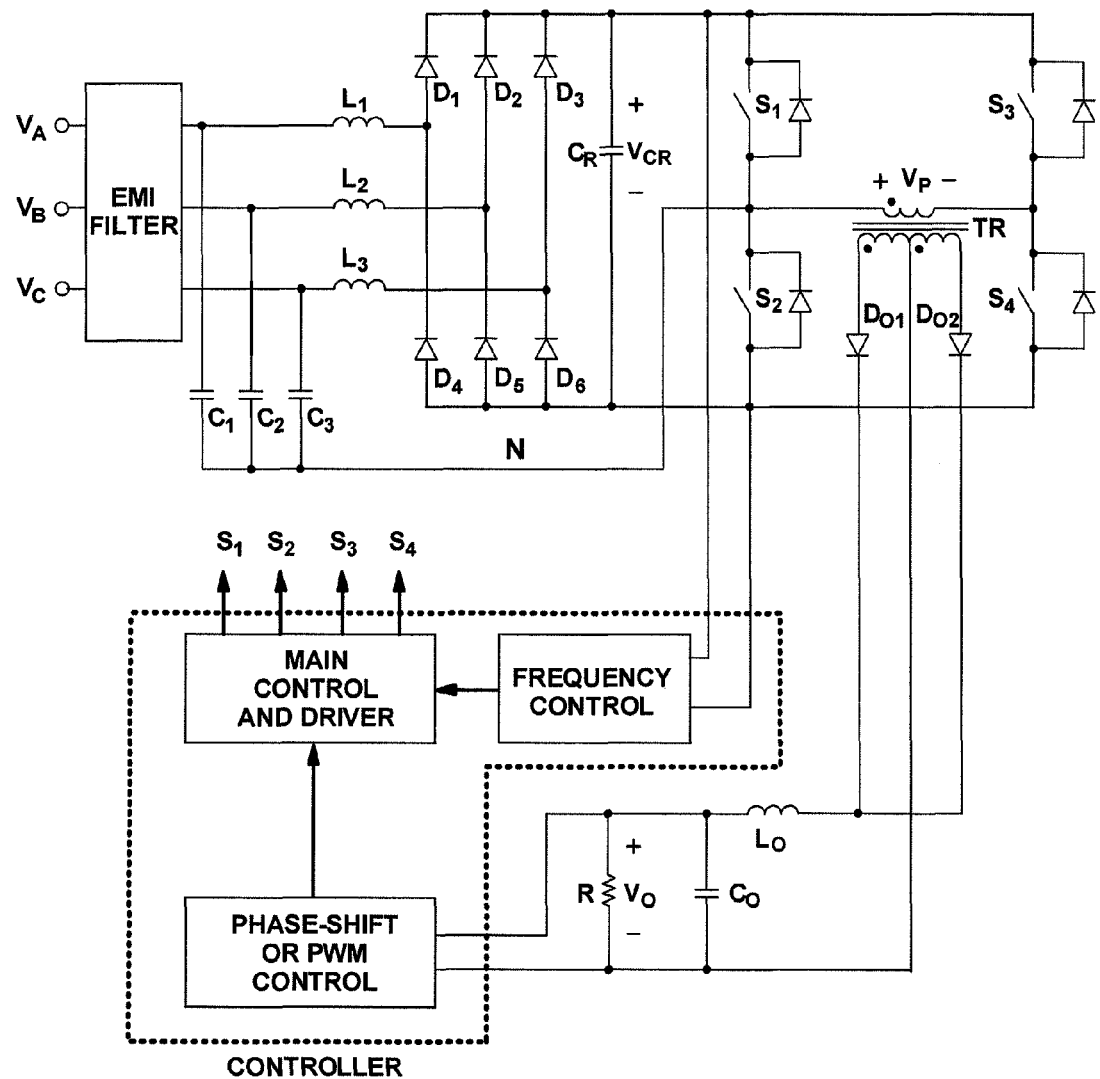
FIG. 26 shows a block diagram of the controller coupled to the circuit in FIG. 23 according to an embodiment of the present invention.

FIG. 23 shows the embodiment in FIG. 19 can also be implemented with a transformer that consists of a single primary winding and a center-tap secondary winding according to an embodiment of the present invention. The timing diagram of switches $S_1$-$S_4$ and primary voltage $V_P$ of transformer TR are shown in FIGS. 24 and 25 which represent a phase-shift control and a PWM control, respectively, according to an embodiment of the present invention. FIG. 26 shows a simplified block diagram of the control scheme according to an embodiment of the present invention.

Figure 27:
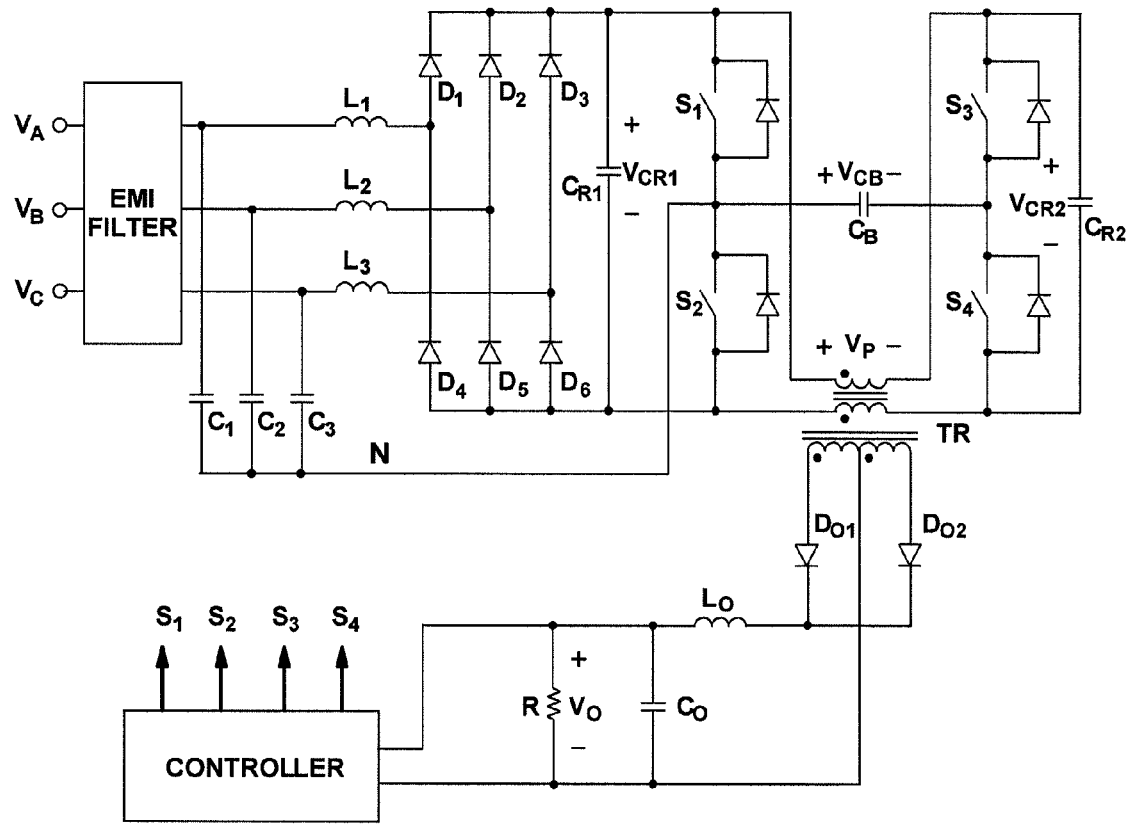
FIG. 27 shows a three-phase four-switch isolated ZVS PFC DCM boost-input full-bridge-output rectifier with a two-primary-winding transformer and a DC current blocking capacitor according to an embodiment of the present invention.
Figure 28:
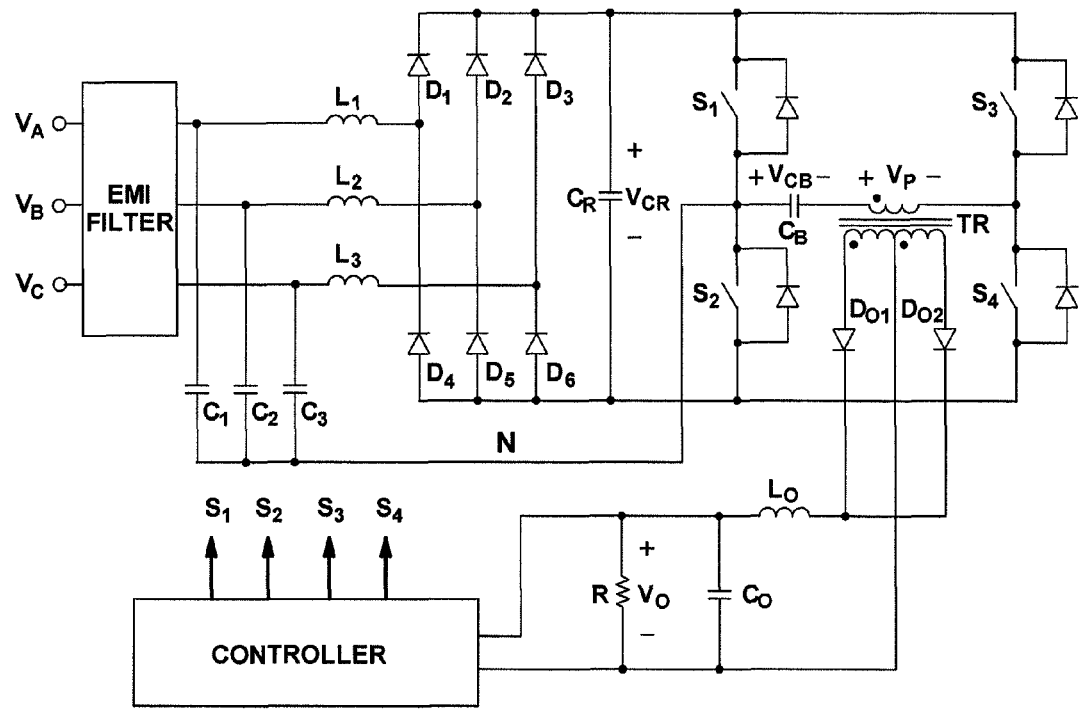
FIG. 28 shows a three-phase four-switch isolated ZVS PFC DCM boost-input full-bridge-output rectifier with a single-primary-winding transformer and a DC current blocking capacitor according to an embodiment of the present invention.

FIGS. 27 and 28 show the embodiments in FIGS. 19 and 23, respectively, can also be implemented with blocking capacitor $C_B$ according to an embodiment of the present invention. By adding blocking capacitor $C_B$ as shown in FIGS. 27 and 28, any DC current in the primary winding of transformer TR can be eliminated. Although the isolated circuits shown in FIGS. 17-28 show the output circuit with a center-tap secondary winding of the transformer and two output diodes, any known output rectifiers such as the current doubler rectifier, the full-bridge rectifier, the half-bridge with voltage doubler capacitors, etc. can be employed in the implementations. In addition, a synchronous rectifier with its control circuit can be employed instead of a filter diode in the implementations.

Figure 29:
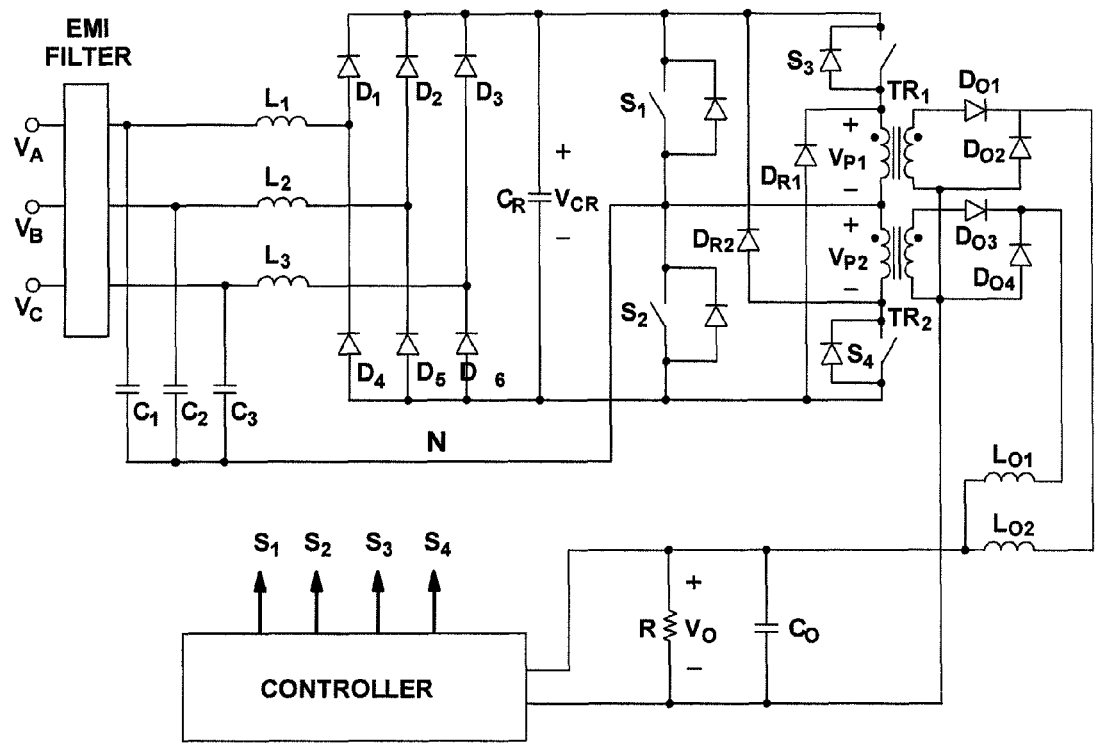
FIG. 29 shows a three-phase four-switch isolated ZVS PFC DCM boost-input forward-output rectifier with two transformers and two output filter inductors according to an embodiment of the present invention.

FIG. 29 shows an embodiment with an interleaved isolated forward type output that is tightly controlled according to an embodiment of the present invention. The primary side of one forward type structure is formed by switches $S_2$ and $S_3$, transformer $TR_1$, diode $D_{R1}$, and the body diode of switch $S_1$ while the secondary side is formed by diodes $D_{O1}$ and $D_{O2}$ and output inductor $L_{O1}$. The primary side of the other forward type structure is formed by switches $S_1$ and $S_4$, transformer $TR_2$, diode $D_{R2}$, and the body diode of switch $S_2$ while the secondary side is formed by diodes $D_{O3}$ and $D_{O4}$ and output inductor $L_{O2}$.

Figure 30:
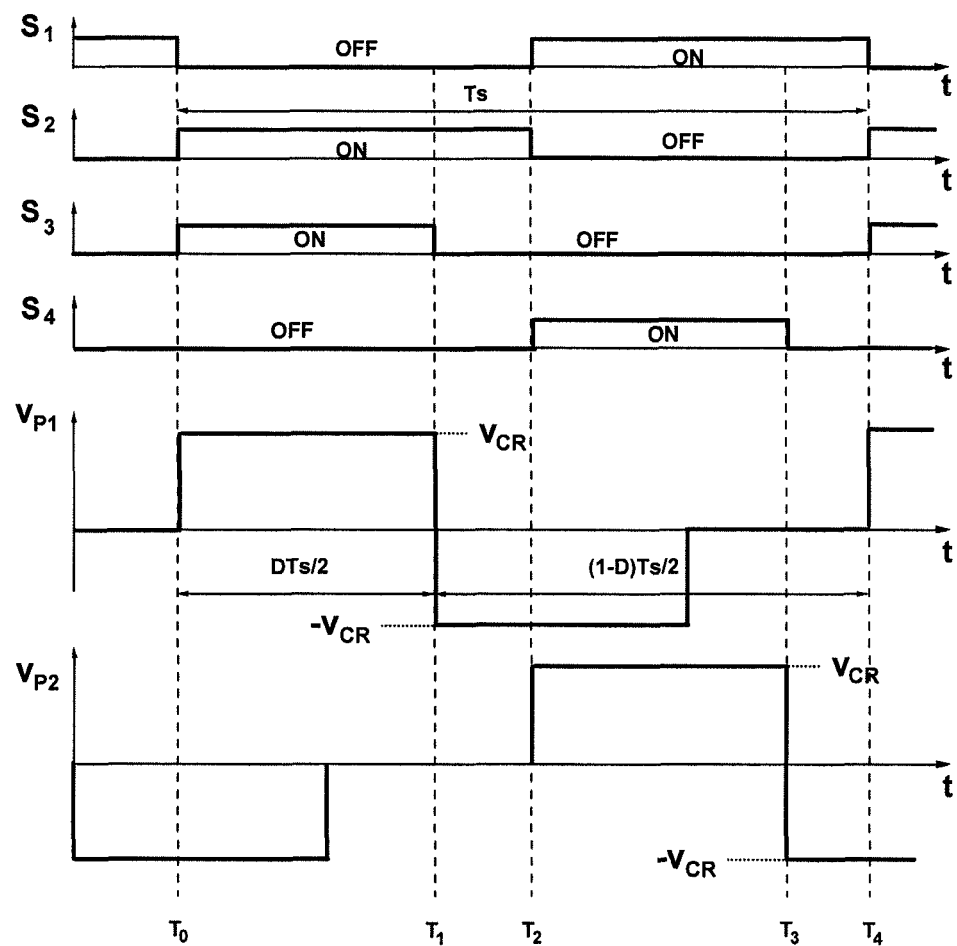
FIG. 30 shows PWM gating waveforms of the four switches of the circuit in FIG. 29 during a switching cycle according to an embodiment of the present invention.

FIG. 30 shows gating waveforms of switches $S_1$-$S_4$ and primary voltage $V_{P1}$ and $V_{P2}$ of transformer $TR_1$ and $TR_2$ according to an embodiment of the present invention. The simultaneous turn on of switches $S_2$ and $S_3$ induces voltage $V_{CR}$ across the primary winding of transformer $TR_1$. After switch $S_3$ turns off at time $T_1$, the magnetizing current of transformer $TR_1$ flows through diode $D_{R1}$ and the body diode of switch $S_1$. As a result, negative voltage $-V_{CR}$ is induced across the primary winding of transformer $TR_1$ until the time when its magnetizing current is completely reset as shown in FIG. 30. A similar voltage waveform is induced across transformer $TR_2$ as shown in FIG. 30 by the switching of switches $S_1$ and $S_4$. It should be noted that switches $S_1$ and $S_2$ always maintain near 50% duty cycle to achieve high PF and low THD.

Figure 31:
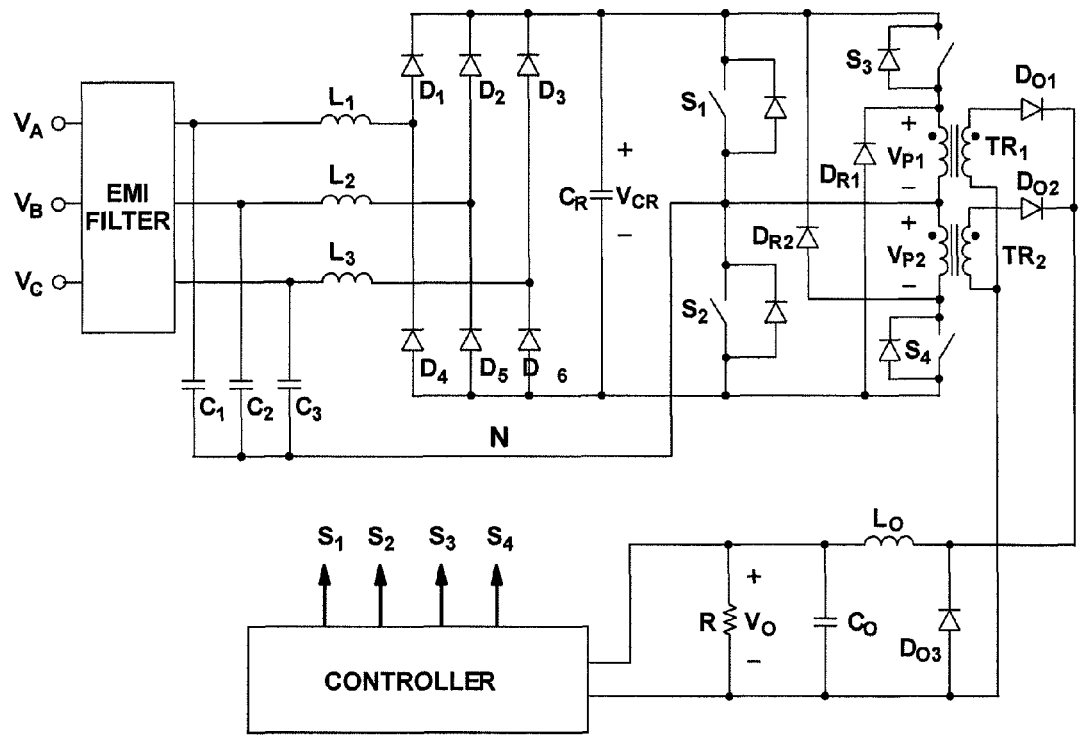
FIG. 31 shows a three-phase four-switch isolated ZVS PFC DCM boost-input forward-output rectifier with, two transformers and an output filter inductor according to an embodiment of the present invention.

FIG. 31 shows the embodiments in FIG. 29 can also be implemented with single output inductor $L_O$ and three output diodes $D_{O1}$-$D_{O3}$ according to an embodiment of the present invention.

Figure 32:
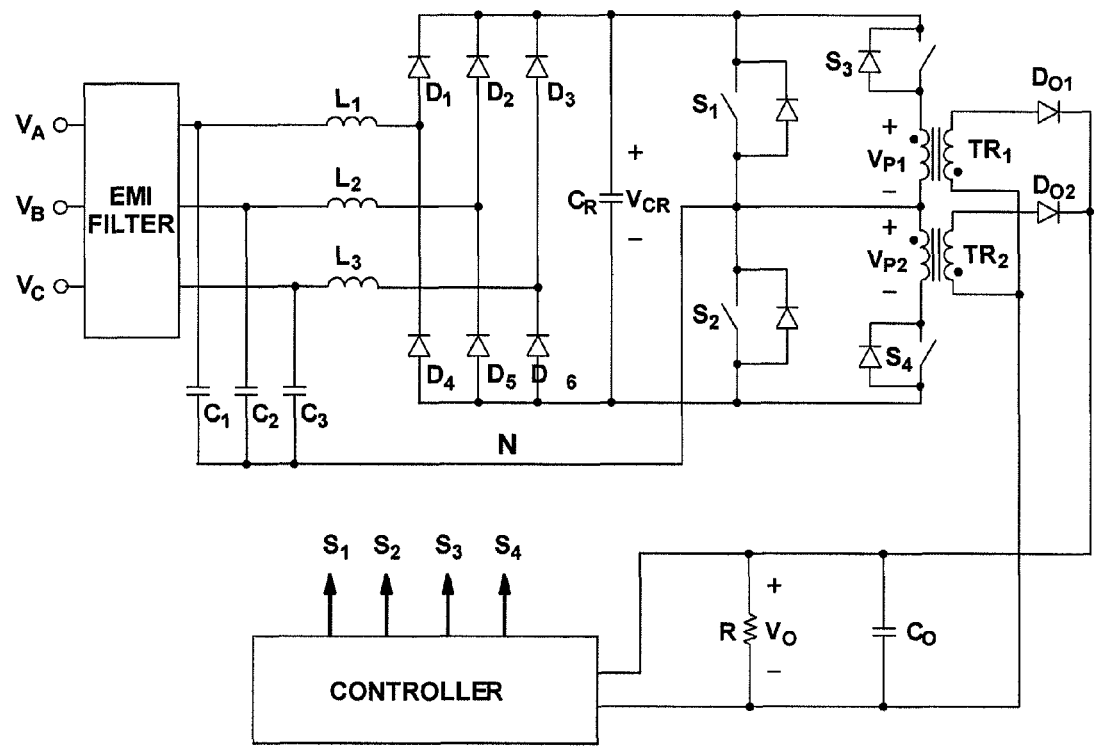
FIG. 32 shows a three-phase four-switch isolated ZVS PFC DCM boost-input flyback-output rectifier with two transformers and an output filter inductor according to an embodiment of the present invention.

FIG. 32 shows an embodiment with an interleaved isolated flyback type output that is tightly controlled according to an embodiment of the present invention. One flyback type structure is formed by switches $S_2$ and $S_3$, transformer $TR_1$, and diodes $D_{O1}$. The other flyback type structure is formed by switches $S_1$ and $S_4$, transformer $TR_2$, and diodes $D_{O2}$.

Figure 33:
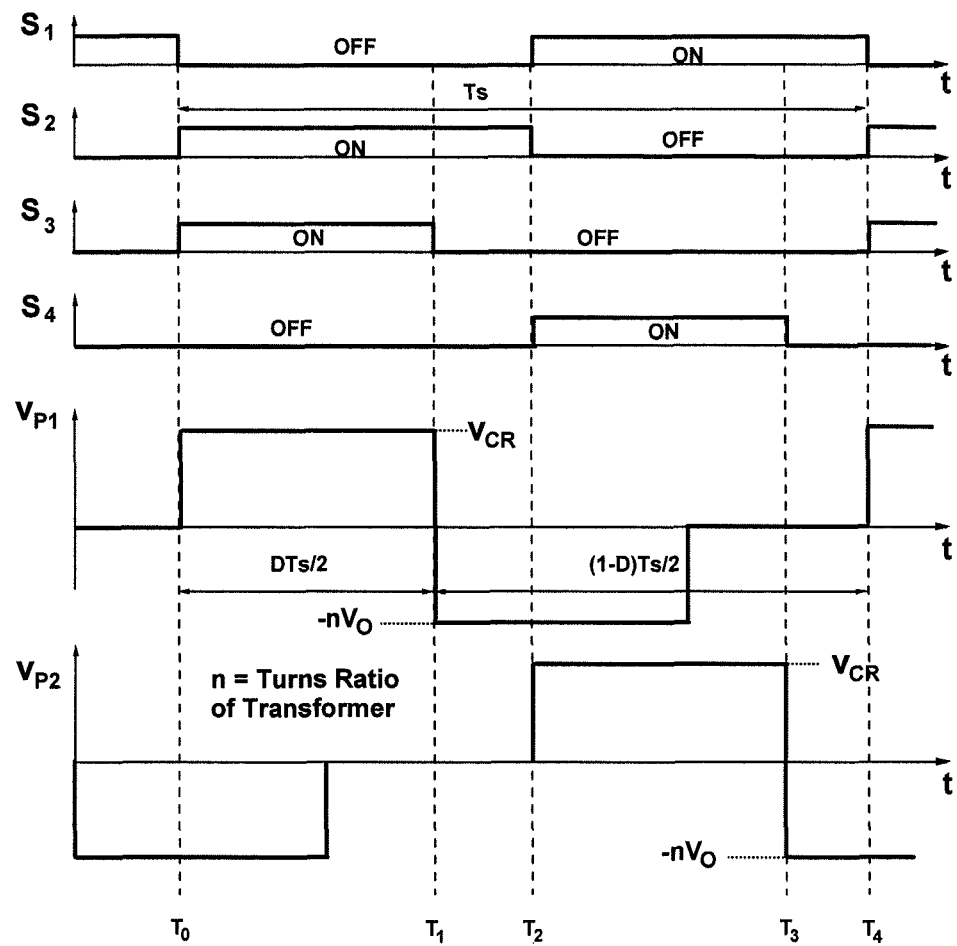
FIG. 33 shows PWM gating waveforms of the four switches of the circuit in FIG. 32 during a switching cycle according to an embodiment of the present invention.

FIG. 33 shows gating waveforms of switches $S_1$-$S_4$ and primary voltage $V_{P1}$ and $V_{P2}$ of transformer $TR_1$ and $TR_2$ according to an embodiment of the present invention. The simultaneous turn on of switches $S_2$ and $S_3$ induces voltage $V_{CR}$ across the primary winding of transformer $TR_1$. After switch $S_3$ turns off at time. $T_1$, the magnetizing current of transformer $TR_1$ flows through diode $D_{O1}$ to output capacitor $C_O$.

As a result, the reflected output voltage $-nV_O$ is induced across the primary winding of transformer $TR_1$ until the time when its magnetizing current reaches zero if it operates in DCM as shown in FIG. 30, where n is the turns ratio of transformer $TR_1$. If the magnetizing inductance of transformer $TR_1$ is sufficiently large, the magnetizing current becomes continuous. A similar voltage waveform is induced across transformer $TR_2$ as shown in FIG. 33 by the switching of switches $S_1$ and $S_4$.

Figure 34:
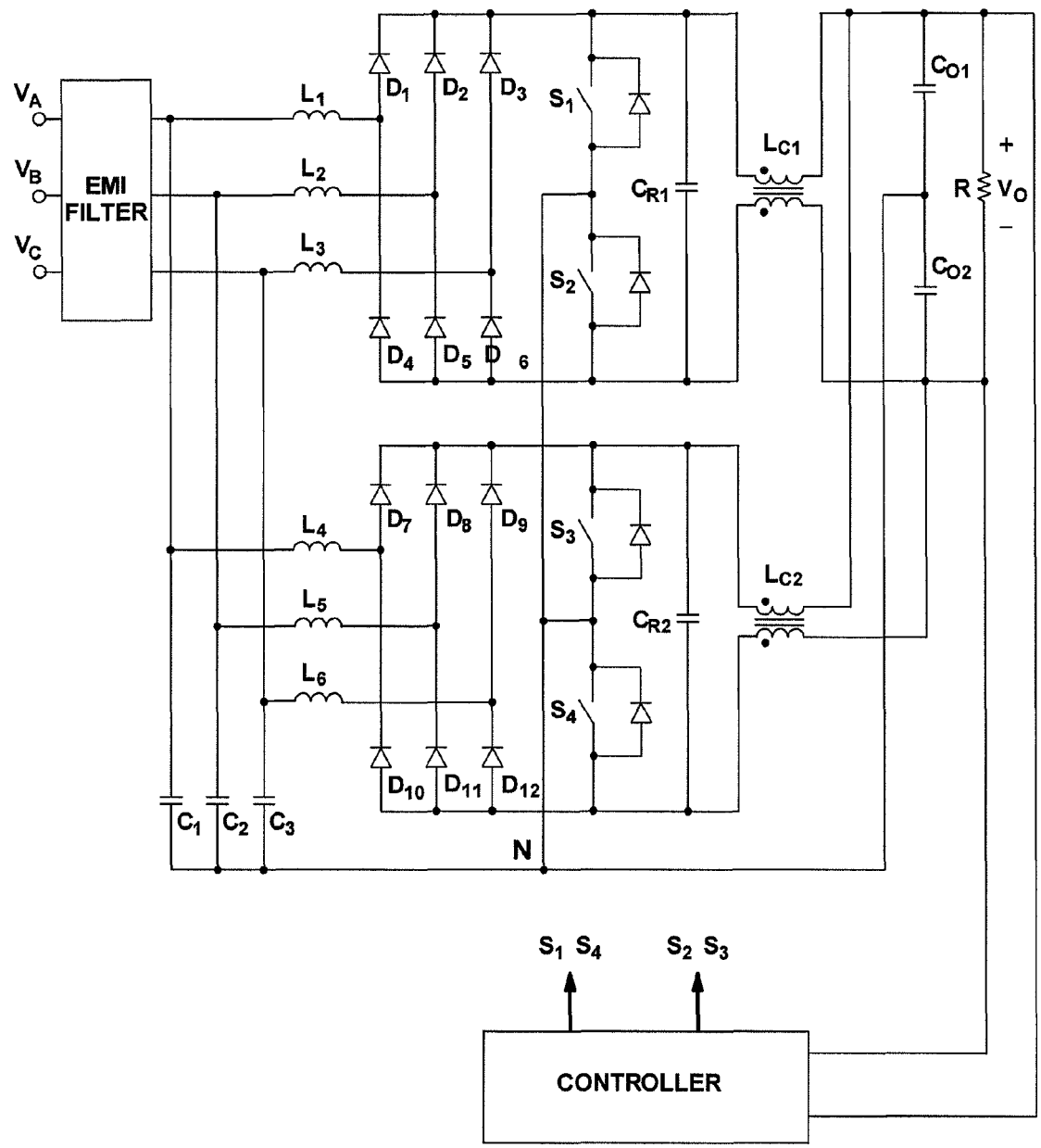
FIG. 34 shows an interleaved three-phase two-switch ZVS PFC DCM boost rectifiers according to an embodiment of the present invention.

FIG. 34 shows the embodiments in FIG. 6 can be paralleled or interleaved according to an embodiment of the present invention. In straightforward parallel operation, switches $S_1$ and $S_3$ are driven by one gating signal, whereas switches $S_2$ and $S_4$ are driven together by the other complementary gating signal. In the interleaved operation, switches $S_1$ and $S_4$ are driven together, whereas switches $S_2$ and $S_3$ are simultaneously driven by the complementary signal. The parallel/interleaved operation in this circuit is possible due to coupled inductor $L_C$ that provides decoupling impedance between the output and the switches.

Figure 35:
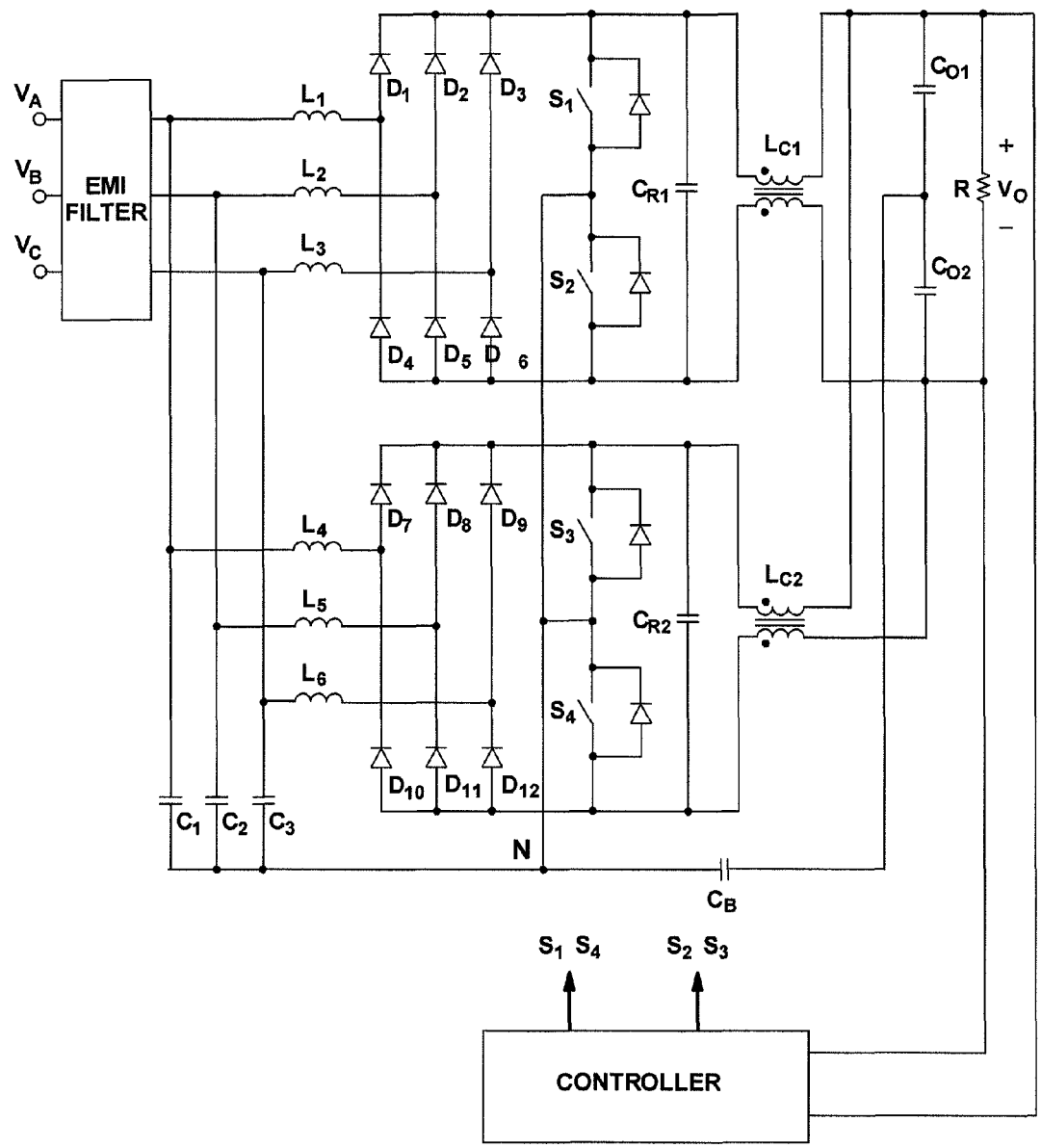
FIG. 35 shows an interleaved three-phase two-switch ZVS PFC DCM boost rectifiers with a DC current blocking capacitor according to an embodiment of the present invention.

FIG. 35 shows by adding blocking capacitor $C_B$ according to an embodiment of the present invention, any DC current circulating from the node among switches $S_1$-$S_4$ to the node between output capacitors $C_{O1}$ and $C_{O2}$ can be prevented.

Figure 36:
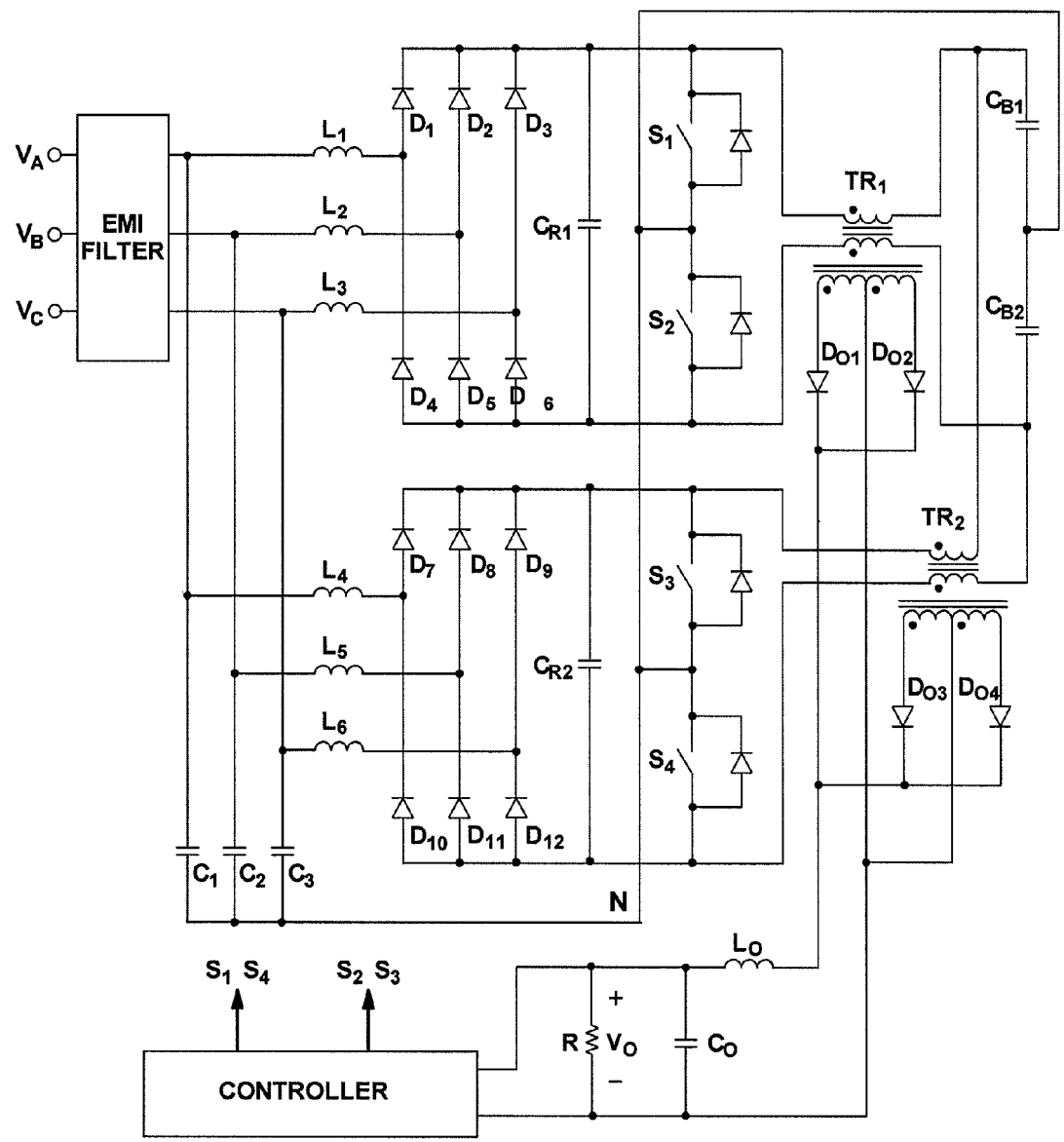
FIG. 36 shows an interleaved three-phase two-switch isolated ZVS PFC DCM boost rectifiers according to an embodiment of the present invention.

FIG. 36 shows the embodiments in FIG. 17 can be paralleled or interleaved according to an embodiment of the present invention. In straightforward parallel operation, switches $S_1$ and $S_3$ are driven by the same signal, whereas switches $S_2$ and $S_4$ are driven together with a complementary signal. In the interleaved operation, switches $S_1$ and $S_4$ are driven together, whereas switches $S_2$ and $S_3$ are simultaneously driven by the complementary signal.

Figure 37:
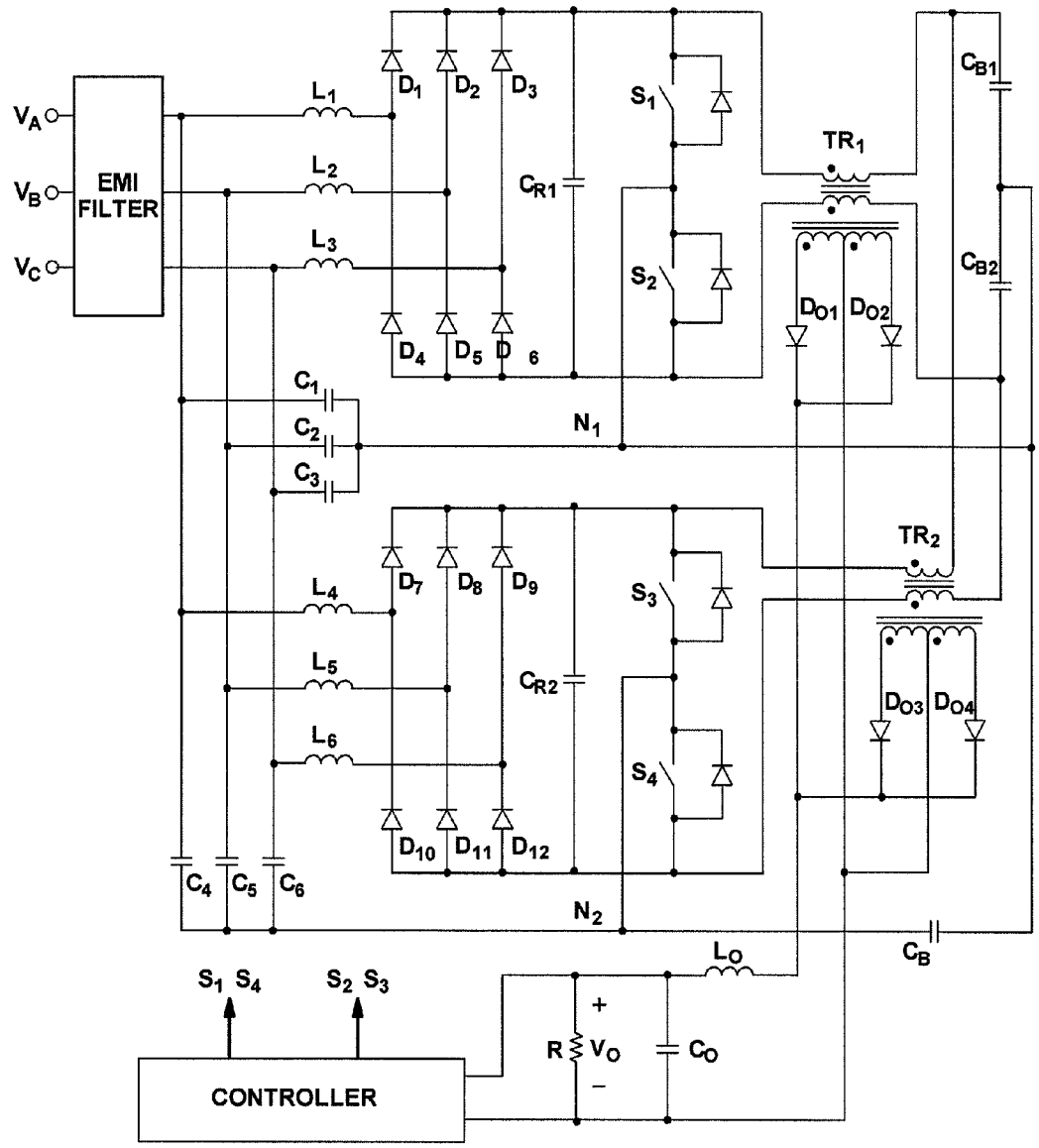
FIG. 37 shows an interleaved three-phase two-switch isolated ZVS PFC DCM boost rectifiers with a DC current blocking capacitor according to an embodiment of the present invention.

FIG. 37 shows by adding blocking capacitor $C_B$ according to an embodiment of the present invention, any DC current circulating from the node between switch $S_1$ and $S_2$ to the node between switch $S_3$ and $S_4$ can be prevented.

Figure 38:
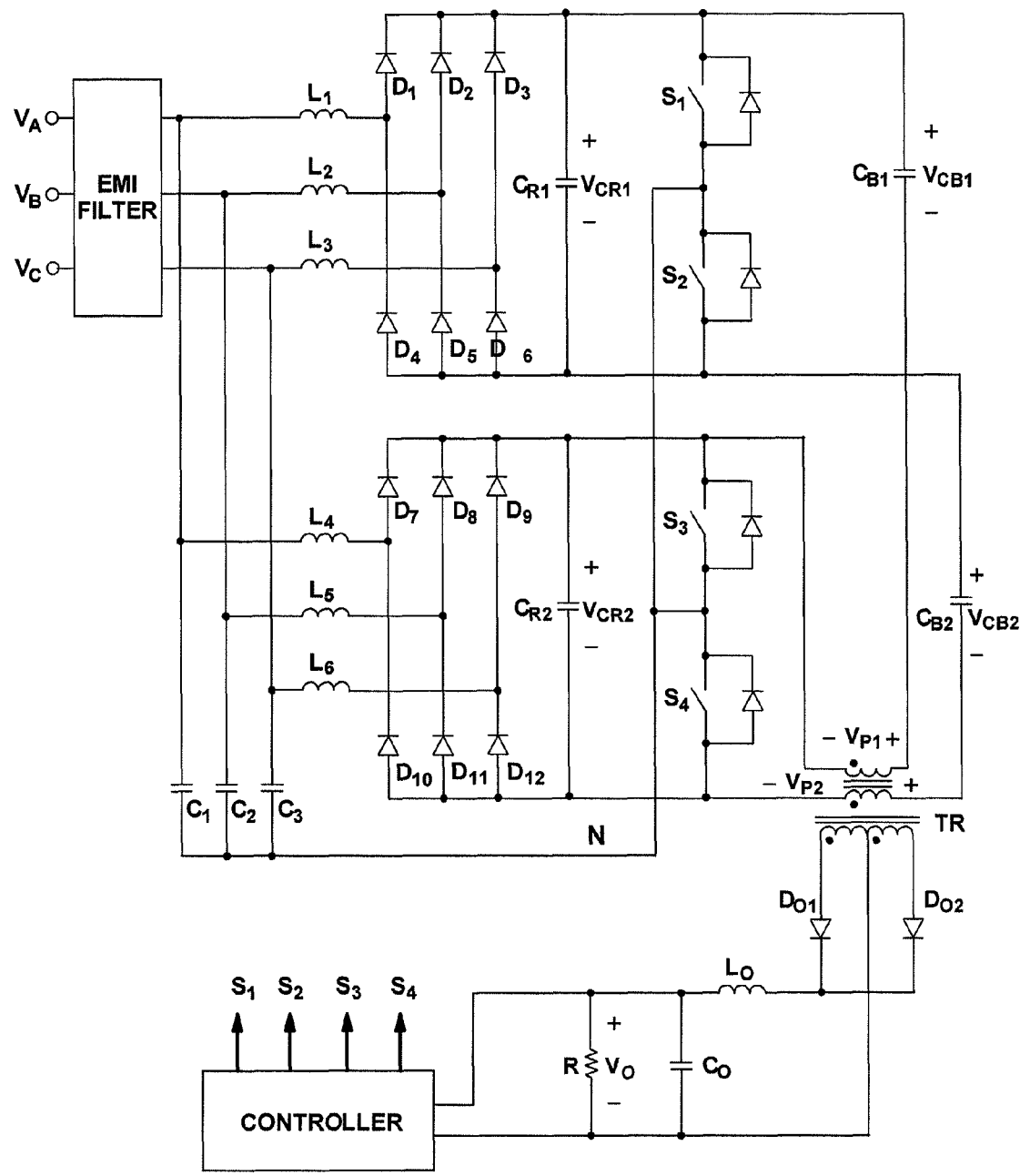
FIG. 38 shows an interleaved three-phase two-switch isolated ZVS PFC DCM boost rectifiers with an additional phase-shift control according to an embodiment of the present invention.

FIG. 38 shows a tightly controlled output can be achieved without additional switches if two isolated PFC rectifiers are connected in parallel according to an embodiment of the present invention. The rectifier includes an input stage for receiving a three-phase input voltage in relation to a neutral node and an output stage adapted to couple to at least one load. The output stage including a plurality of output capacitors coupled to the neutral node.

The rectifier further includes one or more capacitors coupled between corresponding phases of the three-phase input voltage and the neutral node and includes at least two switching converter stages, e.g., isolated PFC rectifiers, each having a plurality of switches coupled to the neutral node, the plurality of switches operating with a fixed duty cycle, the fixed duty cycle being a substantially 50% duty cycle. The switching converter stages further include one or more boost inductors that are coupled to corresponding phases of the three-phase input voltage, one or more input bridge diodes coupled between the one or more boost inductors and the plurality of switches of the converter stages, and one or more flying capacitors coupled across the plurality of switches of the converter stages.

The rectifier further includes one or more controllers adapted to vary the switching frequency of the plurality of switches of the corresponding switching converter stage based on at least one of a condition of the at least one load or the input voltage and includes one or more decoupling stages, each including one or more transformers adapted to isolate the output stage from the plurality of switching converter stages. The transformer includes one or more primary windings coupled between the plurality of switching converter stages. The controller is further adapted to operate the plurality of the switches of the plurality of switching converter stages with a phase-shifted control.

The transformer may include one or more primary windings coupled between the plurality of switching converter stages through one or more blocking capacitors to the neutral node.

Figure 39:
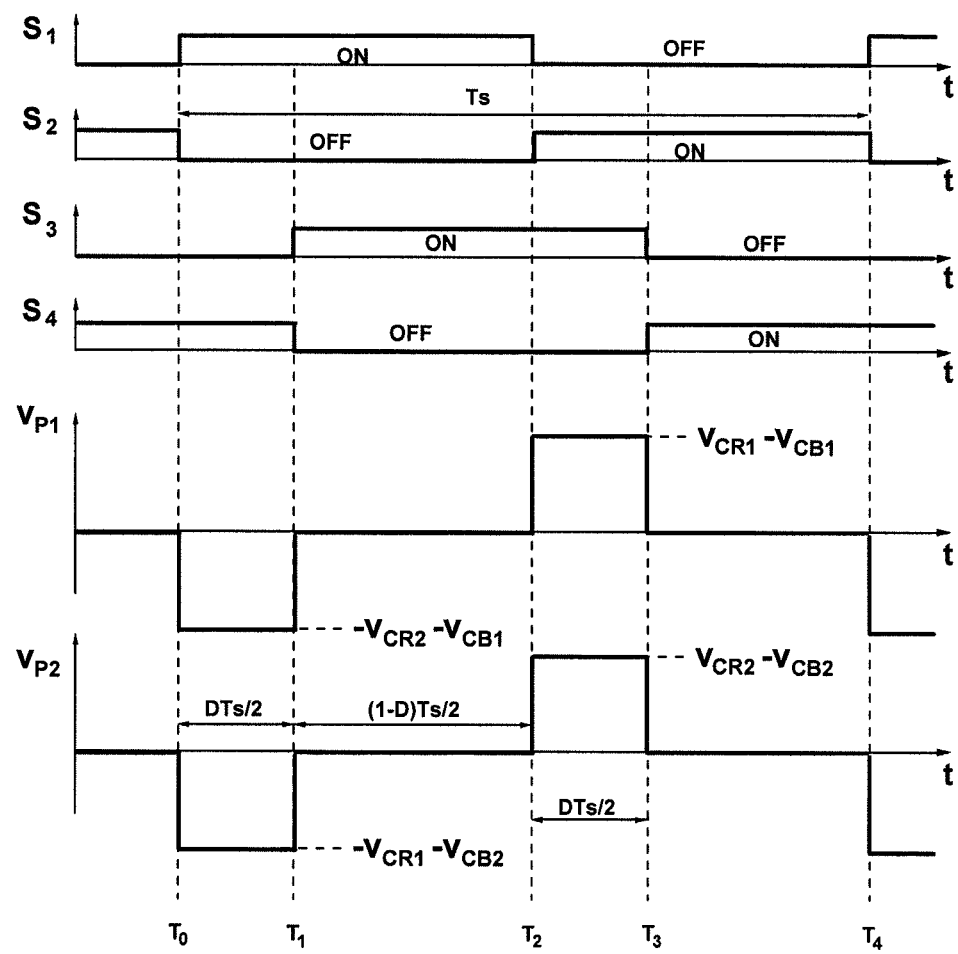
FIG. 39 shows phase-shift-controlled gating waveforms of the four switches of the circuit in FIG. 38 during a switching cycle according to an embodiment of the present invention.

FIG. 39 shows gating waveforms of switches $S_1$-$S_4$ according to an embodiment of the present invention. The switching of $S_1$ and $S_2$ of the first PFC stage occurs at time $T_0$ while the switching of $S_3$ and $S_4$ of the second PFC stage occurs at time $T_1$. This phase shift between the two switching events creates PWM voltage waveforms $V_{P1}$ and $V_{P2}$ across the two primary windings of transformer TR as shown in FIG. 39. Switches $S_1$-$S_4$ operate with a slowly varying switching frequency and near 50% duty cycle to achieve high PF and low THD while the variation of the phase shift angle tightly regulates the output voltage.

Figure 40:
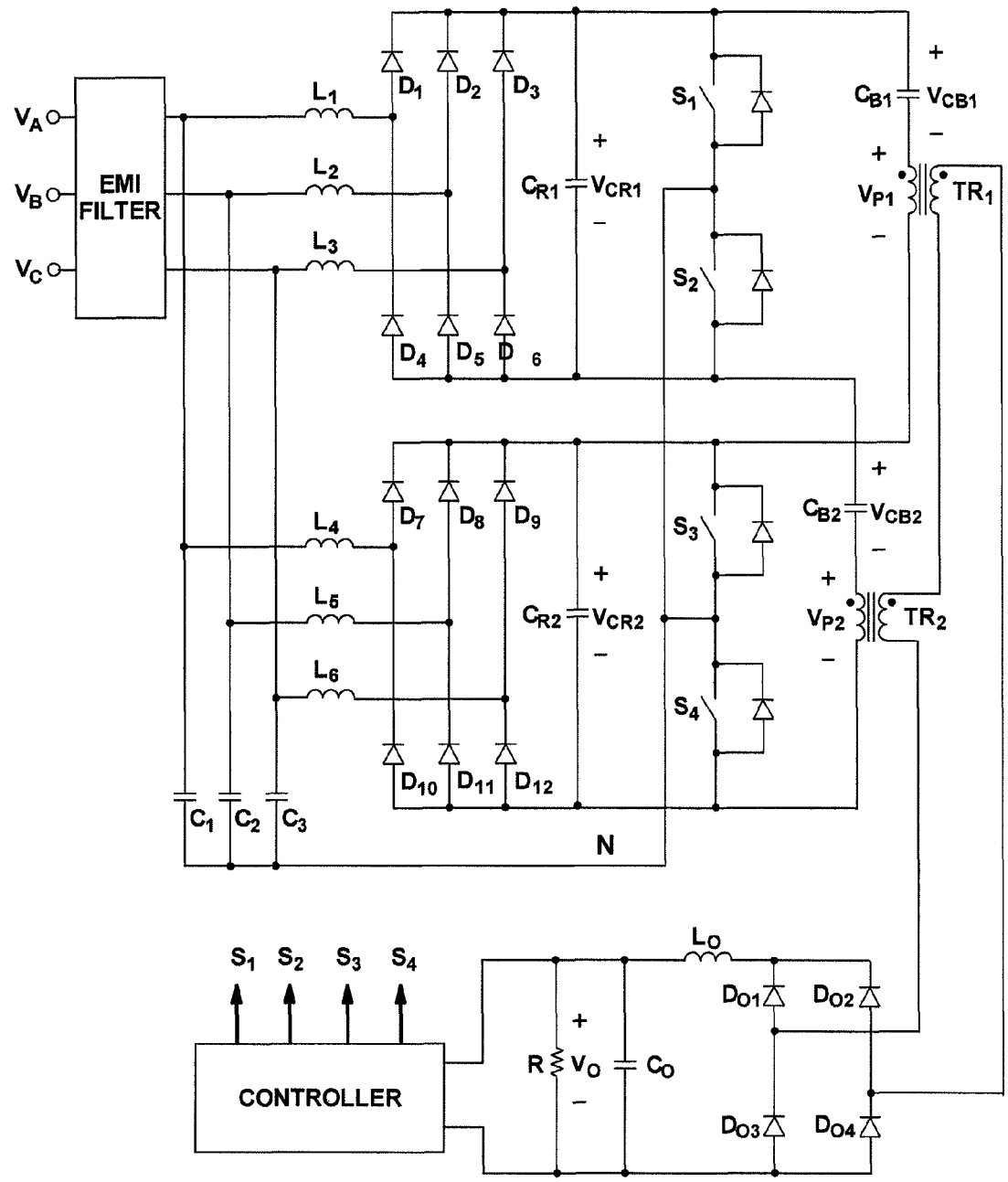
FIG. 40 shows an interleaved three-phase two-switch isolated ZVS PFC DCM boost rectifiers with two transformers and an additional phase-shift control according to an embodiment of the present invention.

FIG. 40 shows the embodiments in FIG. 39 can also be implemented with two transformers $TR_1$ and $TR_2$ with series connected secondary windings for current sharing according to an embodiment of the present invention.

Figure 41:
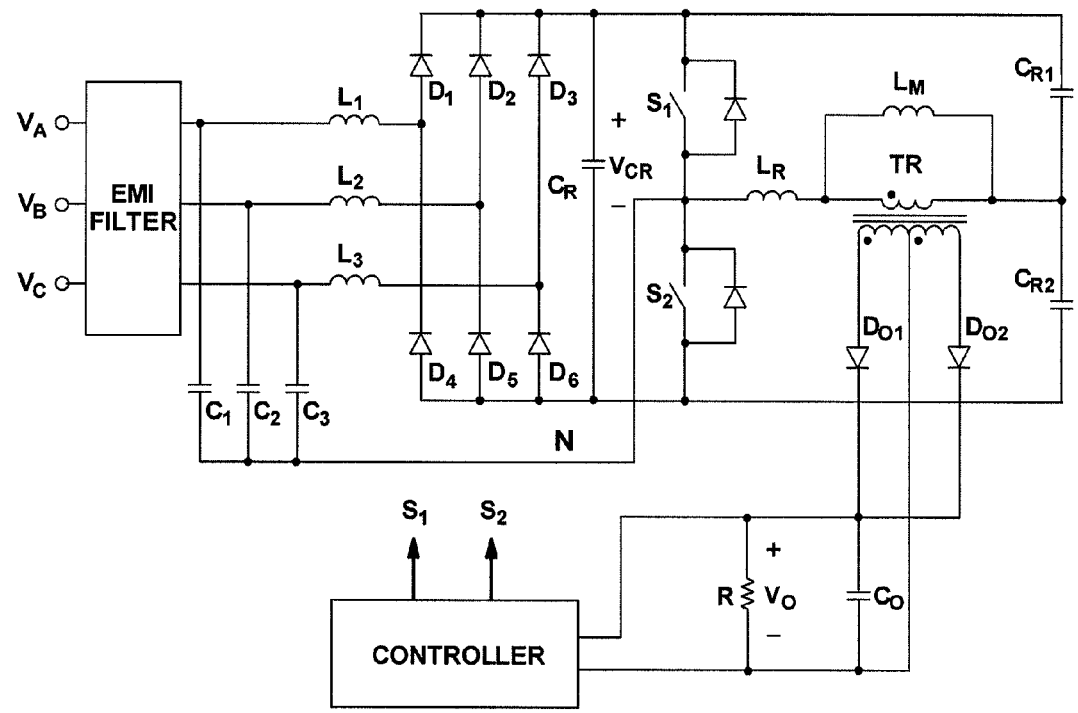
FIG. 41 shows a three-phase two-switch isolated ZVS PFC DCM boost rectifier with resonant components according to an embodiment of the present invention.
Figure 42:
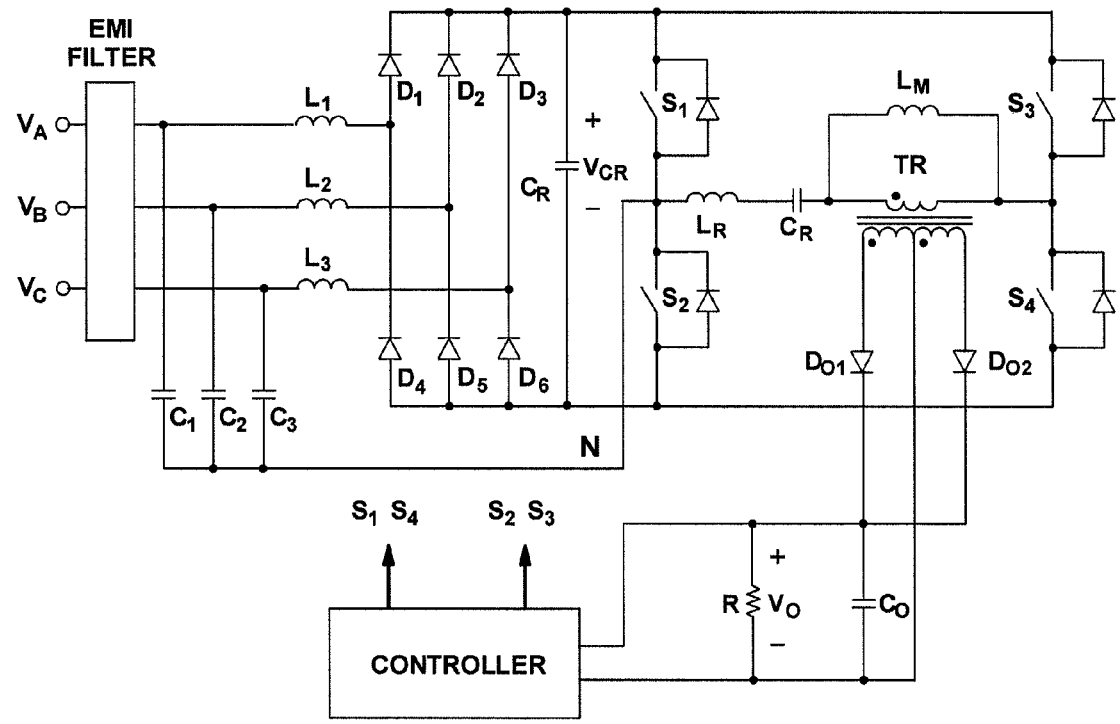
FIG. 42 shows a three-phase four-switch isolated ZVS PFC DCM boost rectifier with resonant components according to an embodiment of the present invention.

FIG. 41 shows another embodiment of the circuit with isolated outputs with a half-bridge resonant type structure according to an embodiment of the present invention, while FIG. 42 shows a full-bridge resonant type structure according to an embodiment of the present invention. Any resonant tank circuit such as series, parallel, LLC, LCC and LLCC resonant circuits can be employed.

Figure 43:
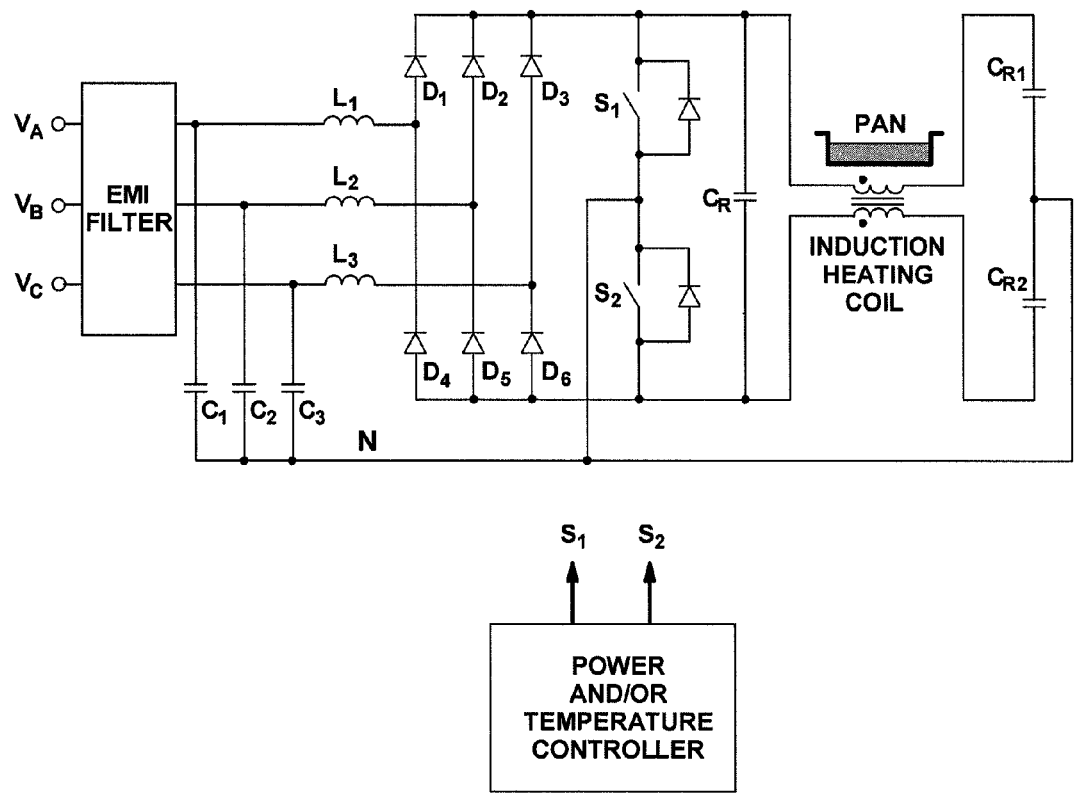
FIG. 43 shows a three-phase two-switch ZVS PFC DCM boost rectifier with coupled induction heating coils and two resonant capacitors according to an embodiment of the present invention.

FIG. 43 shows the coupled inductor of the rectifier shown in FIG. 6 can be replaced by two induction-heating coils according to an embodiment of the present invention. Accordingly, one or more induction-heating coils may be an inductive element of the rectifier. Resonant capacitors $C_{R1}$ and $C_{R2}$ and the induction heating coils form a resonant tank to deliver magnetic energy to any conductive material with resistance such as a metal pan. The pan heats up by eddy-current losses induced by the coupled magnetic energy.

Figure 44:
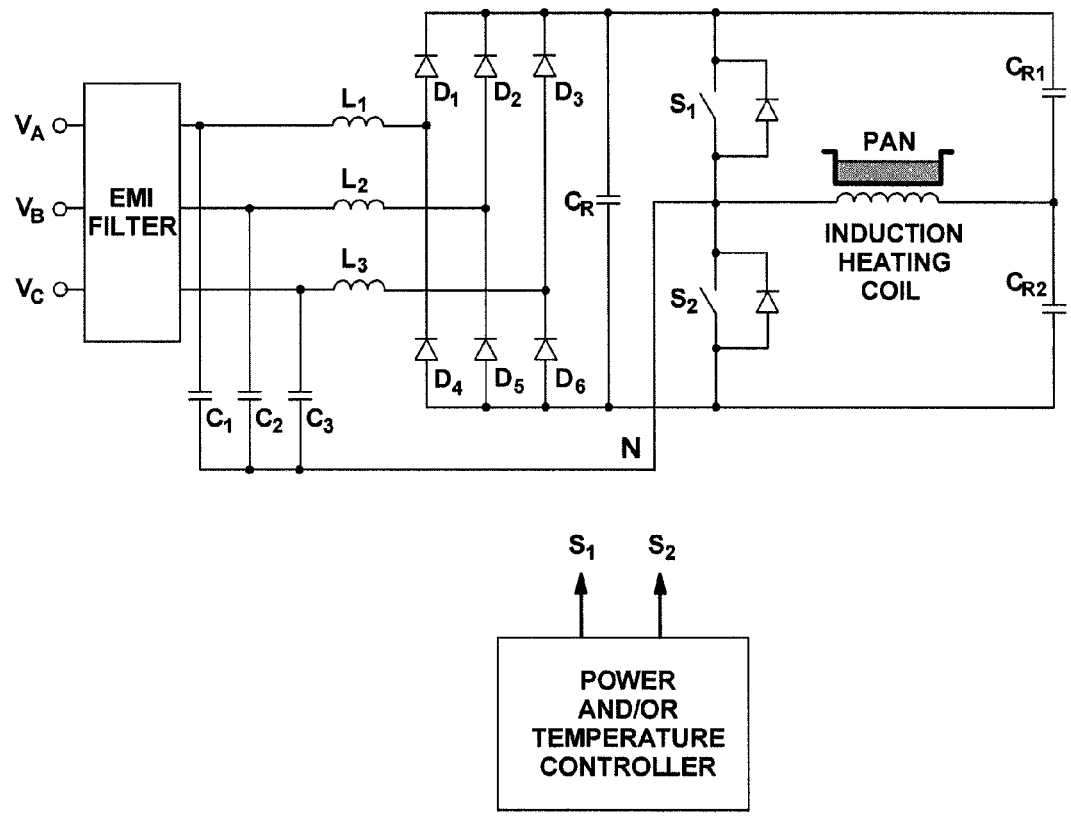
FIG. 44 shows a three-phase two-switch ZVS PFC DCM boost rectifier with an induction-heating coil and two resonant capacitors according to an embodiment of the present invention.
Figure 45:
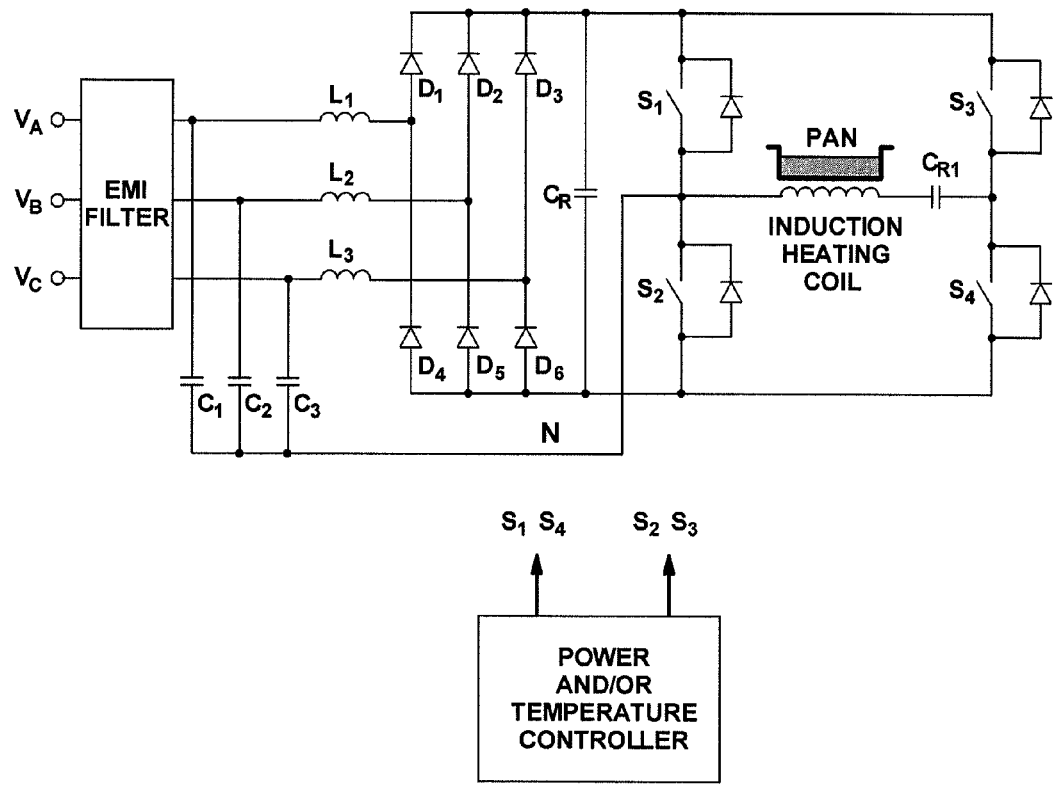
FIG. 45 shows a three-phase four-switch ZVS PFC DCM boost rectifier with an induction-heating coil and a resonant capacitor according to an embodiment of the present invention.
Figure 46:
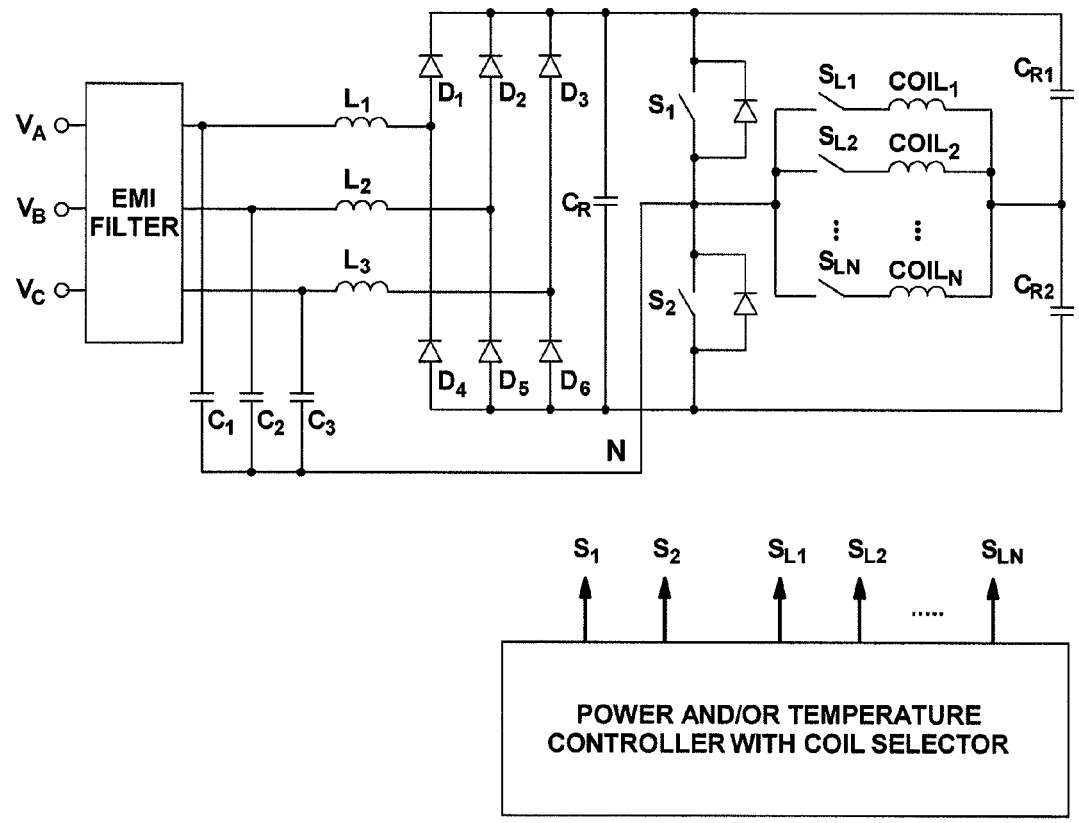
FIG. 46 shows a three-phase two-switch ZVS PFC DCM boost rectifier with multiple induction heating coils and selection switches according to an embodiment of the present invention.

FIG. 44 shows another embodiment of the circuit with an induction-heating coil and half-bridge structure according to an embodiment of the present invention while FIG. 45 shows a circuit with an induction-heating coil and full-bridge structure according to an embodiment of the present invention. FIG. 46 shows multiple induction heating coils can be coupled to the circuit by series connected switches according to an embodiment of the present invention. The series connected switches may be corresponding coil selection switches.

TABLE I

THD and harmonics of average boost inductor
currents if a path of triplen harmonics is
provided, i.e., the neutral wire of the
three-phase input source and virtual neutral N
is directly connected. M is the input-to-output
voltage conversion ratio defined in Eq. (6).

| M | PF | THD [%] | $3^{rd}$ [%] | sum of other harmonics $5^{th}$-$99^{th}$ [%] |
|---|---|---|---|---|
| 2 | 0.992 | 12.64 | 12.53 | 0.67 |
| 2.5 | 0.996 | 9.17 | 9.13 | 0.75 |
| 3 | 0.997 | 7.22 | 7.18 | 0.82 |
| 3.5 | 0.998 | 5.95 | 5.92 | 0.8 |
| 4 | 0.999 | 5.1 | 5.0 | 0.76 |

The invention claimed is:

1. A low input-current harmonic three-phase boost rectifier, comprising:
an input stage for receiving a three-phase input voltage in relation to a neutral node;
an output stage adapted to couple to at least one load, the output stage comprising a plurality of output capacitors coupled to said neutral node;
one or more capacitors coupled between corresponding phases of said three-phase input voltage and said neutral node;
one or more switching converter stages, each having a plurality of switches coupled to said neutral node, said plurality of switches operating with a fixed duty cycle, said fixed duty cycle being a substantially 50% duty cycle, the one or more converter stages further comprising one or more boost inductors that are coupled to corresponding phases of the three-phase input voltage, one or more input bridge diodes coupled between the one or more boost inductors and said plurality of switches of the converter stages, and one or more flying capacitors coupled across said plurality of switches of the converter stages;
one or more controllers adapted to vary the switching frequency of the plurality of switches based on at least one of a condition of the at least one load or the input voltage; and
one or more decoupling stages, each decoupling stage comprising a primary inductive element and a secondary inductive element, wherein the primary inductive element has a primary terminal and the secondary inductive element has a secondary terminal, said primary terminal and said secondary terminal being connected across a switching converter stage to inductively decouple the output stage from the switching converter stage.

2. The low input-current harmonic boost rectifier of claim 1, wherein one or more switches of the plurality of switches are turned on at a substantially zero voltage across the one or more switches.

3. The low input-current harmonic boost rectifier of claim 1, wherein the controller is adapted to vary the switching frequency based on at least one of a minimum frequency determined by a full load and a minimum input voltage or a maximum frequency determined by a light load and a maximum input voltage.

4. The low input-current harmonic boost rectifier of claim 1, wherein the controller is adapted to operate in a burst mode over the range between a light load and no load.

5. The low input-current harmonic boost rectifier of claim 1, wherein the inductive elements are magnetically coupled.

6. The low input-current harmonic boost rectifier of claim 1, wherein each one of the output capacitors is adapted to couple across at least one load.

7. The low input-current harmonic boost rectifier of claim 1, wherein the voltages across each one of the output capacitors are substantially equal.

8. The low input-current harmonic boost rectifier of claim 1, further comprising a blocking capacitor coupled between the neutral node and the output capacitors of the output stage.

9. The low input-current harmonic boost rectifier of claim 1, wherein the output capacitors of the output stages are coupled to an input neutral wire of a three-phase four-wire input system.

10. The low input-current harmonic boost rectifier of claim 1, wherein one or more blocking diodes are coupled between the plurality of switches and the one or more flying capacitors.

11. The low input-current harmonic boost rectifier of claim 1, wherein one or more inrush current control circuits are coupled between the input voltage and the capacitors.

12. The low input-current harmonic boost rectifier of claim 1, wherein the input stage further comprises input electromagnetic interference (EMI) filters.

13. The low input-current harmonic boost rectifier of claim 1, wherein the input bridge diodes are synchronous rectifiers.

14. The low input-current harmonic boost rectifier of claim 1, wherein each switch comprises a metal-oxide-semiconductor field-effect transistor (MOSFET) or an insulated gate bipolar transistor (IGBT) with an antiparallel diode.

15. The low input-current harmonic boost rectifier of claim 1, wherein the one or more switching converter stages comprise a plurality of switching converter stages, each being coupled to a corresponding one of the one or more decoupling stages, and wherein the controller is further adapted to operate the plurality of switches of the plurality of switching converter stages in an interleaved or a parallel manner.

16. The low input-current harmonic boost rectifier of claim 1, wherein the one or more switching converter stages comprise a plurality of switching converter stages, each being coupled to a corresponding one of the one or more decoupling stages through one or more blocking capacitors, and wherein the controller is further adapted to operate the plurality of switches of the plurality of switching converter stages in an interleaved or a parallel manner.

17. The low input-current harmonic boost rectifier of claim 1, wherein the inductive element comprises one or more induction-heating coils.

18. The low input-current harmonic boost rectifier of claim 17, wherein the induction-heating coils are coupled with corresponding coil selection switches.

19. A low input-current harmonic three-phase boost rectifier, comprising:
an input stage for receiving a three-phase input voltage in relation to a neutral node;
an output stage adapted to couple to at least one load;
one or more capacitors coupled between corresponding phases of said three-phase input voltage and said neutral node;
at least two switching converter stages, each having a plurality of switches coupled to said neutral node, said plurality of switches operating with a fixed duty cycle, said fixed duty cycle being a substantially 50% duty cycle, the switching converter stages further comprising one or more boost inductors that are coupled to corresponding phases of the three-phase input voltage, one or more input bridge diodes coupled between the one or more boost inductors and said plurality of switches of the converter stages, and one or more flying capacitors coupled across said plurality of switches of the converter stages;
one or more controllers adapted to vary the switching frequency of the plurality of switches of the corresponding switching converter stage based on at least one of a condition of the at least one load or the input voltage; and
one or more decoupling stages, each decoupling stage comprising one or more transformers adapted to isolate the output stage from the plurality of switching converter stages, wherein a transformer comprises primary and secondary and output windings, wherein the primary winding has a primary terminal and the secondary winding has a secondary terminal, said primary terminal and said secondary terminal being connected across a switching converter stages, and wherein said output winding galvanically isolates said input stage from said output stage and wherein said controller is further adapted to operate the plurality of the switches of the plurality of switching converter stages with a phase-shifted control.

20. The low input-current harmonic boost rectifier of claim 19, wherein the transformer further comprises one or more primary windings coupled between the plurality of switching converter stages through one or more blocking capacitors.

21. The low input-current harmonic boost rectifier of claim 19, further comprising a center-tap winding and rectifiers at an output side of the transformer.

22. The low input-current harmonic boost rectifier of claim 19, further comprising a full-wave rectifier at an output side of the transformer.

23. The low input-current harmonic boost rectifier of claim 19, further comprising a current doubler rectifier at an output side of the transformer.

24. The low input-current harmonic boost rectifier of claim 19, further comprising synchronous rectifiers at an output side of the transformer.

25. The low input-current harmonic boost rectifier of claim 19, further comprising a filter at an output side of the transformer.

26. The low input-current harmonic boost rectifier of claim 19, wherein one or more switches of the plurality of switches are turned on at a substantially zero voltage across the one or more switches.

27. The low input-current harmonic boost rectifier of claim 19, wherein the controller is adapted to vary the switching frequency based on at least one of a minimum frequency determined by a full load and a minimum input voltage or a maximum frequency determined by a light load and a maximum input voltage.

28. The low input-current harmonic boost rectifier of claim 19, wherein the controller is adapted to operate in a burst mode over the range between a light load and no load.

29. The low input-current harmonic boost rectifier of claim 19, wherein one or more inrush current control circuits are coupled between the input voltage and the capacitors.

30. The low input-current harmonic boost rectifier of claim 19, wherein the input stage further comprises input electromagnetic interference (EMI) filters.

31. The low input-current harmonic boost rectifier of claim 19, wherein the input bridge diodes are synchronous rectifiers.

32. The low input-current harmonic boost rectifier of claim 19, wherein each switch comprises a MOSFET or an IGBT with an antiparallel diode.

33. A low input-current harmonic three-phase boost rectifier, comprising:
an input stage for receiving a three-phase input voltage in relation to a neutral node;
an output stage adapted to couple to at least one load;
one or more capacitors coupled between corresponding phases of said three-phase input voltage and said neutral node;
one or more switching converter stages, each having a plurality of switches coupled to said neutral node, said plurality of switches operating with a fixed duty cycle, said fixed duty cycle being a substantially 50% duty cycle, the one or more converter stages further comprising one or more boost inductors that are coupled to corresponding phases of the three-phase input voltage, one or more input bridge diodes coupled between the one or more boost inductors and said plurality of switches of the converter stages, and one or more flying capacitors coupled across said plurality of switches of the converter stages;
one or more controllers adapted to vary the switching frequency of the plurality of switches based on at least one of a condition of the at least one load or the input voltage;
one or more decoupling stages, each decoupling stage comprising one or more transformers adapted to isolate the output stage from at least one of the one or more switching converter stages, wherein a transformer comprises primary and secondary and output windings, wherein the primary winding has a primary terminal and the secondary winding has a secondary terminal, said primary terminal and said secondary terminal being connected across a switching converter stages, and wherein said output winding galvanically isolates said input stage from said output stage and a plurality of auxiliary switches coupled to said plurality of switches of said one or more switching converter stages through said at least one transformer, wherein the controller is further adapted to operate said plurality of auxiliary switches according to at least one of phase-shift or pulse width modulation.

34. The low input-current harmonic boost rectifier of claim 33 wherein said plurality of auxiliary switches coupled to said plurality of switches of said one or more switching converter stages through said at least one transformer form at least one full-bridge converter.

35. The low input-current harmonic boost rectifier of claim 33, wherein the transformer comprises a primary winding coupled between the junction of the auxiliary switches and the neutral node.

36. The low input-current harmonic boost rectifier of claim 33, wherein the transformer comprises a primary winding coupled through one or more blocking capacitors to the neutral node.

37. The low input-current harmonic boost rectifier of claim 33, further comprising a center-tap winding and rectifiers at an output side of the transformer.

38. The low input-current harmonic boost rectifier of claim 33, further comprising a full-wave rectifier at an output side of the transformer.

39. The low input-current harmonic boost rectifier of claim 33, further comprising a current doubler rectifier at an output side of the transformer.

40. The low input-current harmonic boost rectifier of claim 33, further comprising synchronous rectifiers at an output side of the transformer.

41. The low input-current harmonic boost rectifier of claim 33, further comprising one or more filters at an output side of the transformer.

42. The low input-current harmonic boost rectifier of claim 33, wherein the plurality of switches and transformers form forward converters.

43. The low input-current harmonic boost rectifier of claim 42, further comprising an output filter with one or more output inductors at an output side of the transformer.

44. The low input-current harmonic boost rectifier of claim 33, wherein the plurality of switches and transformers form flyback converters.

45. The low input-current harmonic boost rectifier of claim 33, wherein the transformer comprises a primary winding coupled to at least one resonant inductor and one or more resonant capacitors.

46. The low input-current harmonic boost rectifier of claim 45, wherein the plurality of switches and transformers form resonant converters.

47. The low input-current harmonic boost rectifier of claim 33, wherein one or more switches of the plurality of switches are turned on at a substantially zero voltage across the one or more switches.

48. The low input-current harmonic boost rectifier of claim 33, wherein the controller is adapted to vary the switching frequency based on at least one of a minimum frequency determined by a full load and a minimum input voltage or a maximum frequency determined by a light load and a maximum input voltage.

49. The low input-current harmonic boost rectifier of claim 33, wherein the controller is adapted to operate in a burst mode over the range between a light load and no load.

50. The low input-current harmonic boost rectifier of claim 33, wherein one or more inrush current control circuits are coupled between the input voltage and the capacitors.

51. The low input-current harmonic boost rectifier of claim 33, wherein the input stage further comprises input electromagnetic interference (EMI) filters.

52. The low input-current harmonic boost rectifier of claim 33, wherein the input bridge diodes are synchronous rectifiers.

53. The low input-current harmonic boost rectifier of claim 33, wherein each switch comprises a MOSFET or an IGBT with an antiparallel diode.

* * * * *